United States Patent [19]
Nakazawa

[11] Patent Number: 5,889,400
[45] Date of Patent: Mar. 30, 1999

[54] SENSOR ARRANGED FOR DETECTING ANGULAR DISPLACEMENT AND DIRECTION OF VALVE AXLE

[75] Inventor: Hirotsugu Nakazawa, Gunma, Japan

[73] Assignee: Unisia Jecs Corporation, Atsugi, Japan

[21] Appl. No.: 813,084

[22] Filed: Mar. 7, 1997

[30] Foreign Application Priority Data

Mar. 8, 1996 [JP] Japan ..................................... 8-080801
Mar. 8, 1996 [JP] Japan ..................................... 8-080802

[51] Int. Cl.⁶ ............................... G01B 7/30; G01D 5/18
[52] U.S. Cl. .................. 324/207.2; 123/617; 324/207.25
[58] Field of Search .................................... 324/173, 174, 324/207.12, 207.2, 207.21, 207.22, 207.25; 123/617, 414; 310/156

[56] References Cited

U.S. PATENT DOCUMENTS

| | | | |
|---|---|---|---|
| 2,536,805 | 1/1951 | Hansen, Jr. | 324/207.2 X |
| 3,162,804 | 12/1964 | Parsons | 324/207.2 X |
| 3,530,317 | 9/1970 | Lang | 324/207.2 X |
| 5,164,668 | 11/1992 | Alfors | 324/207.2 |
| 5,350,043 | 9/1994 | Crewson et al. | 188/79.55 |
| 5,462,026 | 10/1995 | Kumagai | 123/396 |
| 5,627,465 | 5/1997 | Alfors et al. | 324/207.2 |
| 5,811,968 | 9/1998 | Nakazawa et al. | 324/207.2 |
| 5,823,165 | 10/1998 | Sato et al. | 123/399 |

FOREIGN PATENT DOCUMENTS 197 00 046 A1 7/1997 Germany.
2-298814 12/1990 Japan.

*Primary Examiner*—Gerard Strecker
*Attorney, Agent, or Firm*—Foley & Lardner

[57] ABSTRACT

A sensor used to detect an opening angle of, for example, a throttle valve comprising: a pivotable valve axle arranged so as to be pivoted through a pivoted angle; a magnet; a first magnetic circuit, through which a first magnetic flux branched from a total magnetic flux developed from the magnet is passed; a second magnetic circuit, through which a second magnetic flux branched from the total magnetic flux developed from the magnet is passed; a pair of first and second Hall effect devices, the first Hall effect device being interposed in the first magnetic circuit so as to output a first signal according to the first magnetic flux passing therethrough and the second Hall effect device being interposed in the second magnetic circuit so as to output a second signal according to the second magnetic flux passing therethrough; and a calculation circuit, in response to the first and second signals of the first and second Hall effect devices, for calculating a level of a detection signal (So1, So2) of the sensor from the first and second signals outputted from the first and second Hall effect devices and for outputting the detection signal, the level of the detection signal being linearly varied according to the pivoted angle of the valve axle.

37 Claims, 14 Drawing Sheets

SENSOR ARRANGED FOR DETECTING ANGULAR DISPLACEMENT AND DIRECTION OF VALVE AXLE

BACKGROUND OF THE INVENTION

The present invention relates generally to a pivoted angle (angular displacement and its direction) sensor arranged for detecting an angle (and its direction) through which a valve axle is pivoted which is applicable to an engine throttle valve opening angle sensor.

In an automotive vehicle in which an electronically controlled fuel injection system is mounted, an opening angle of an engine throttle valve installed within an intake air passage (pivoted angle) of the engine is detected and the detected opening angle is supplied to an engine control unit having a microcomputer to achieve highly accurate controls of a fuel injection quantity or timing, or of another engine controlled parameter.

Generally, a potentiometer having a resistor body and a brush is used to detect the above-described opening angle of the throttle valve. The brush of the potentiometer is linked to a pivotable axle (valve axle of the throttle valve) and is slid on the resistor body in accordance with a pivotal angular displacement of the throttle valve, thus a variation in a resistance value of the resistor body is detected as the opening angle of the throttle valve. Since the throttle valve opening angle sensor using the potentiometer is of a contact type, a reliability is relatively low and a wear-out of the brush due to a long term use may occur.

On the other hand, a Japanese Patent Application First Publication No. Heisei 2-298814 published on Dec. 11, 1990 exemplifies a previously proposed pivoted angle sensor of a non-contact type using a magnetoresistance element (device). A magnetic field by means of a permanent magnet is developed around the fixed magnetoresistance element. When the magnet is pivoted thereon with the valve axle, the magnetic field is varied with the magnetoresistance element as a center. A change in the pivoted angle, at this time, is detected as a change in the resistance value of the magnetoresistance element. Consequently, the throttle valve opening angle can be detected according to the change in the resistance value of the magnetoresistance element.

However, in the previously proposed pivoted angle sensor using the magnetoresistance element, a spatial distance between an arc portion of a magnetic material installed on the permanent magnet and the magnetoresistance element is largely varied according to the pivotal movement of the valve axle (the magnet) so that an output signal from the magnetoresistance element gives a characteristic of a triangular function to the pivoted angle of the throttle valve axle. Consequently, it is difficult to obtain a desired linear characteristic for the detection of the throttle valve opening angle (pivoted angle).

Furthermore, it is difficult to correct a large variation in an output signal from the magnetoresistance element due to a temperature change in a magnetomotive force of the magnet and an aging effect and a temperature change that the magnetoresistance element has.

SUMMARY OF THE INVENTION

It is therefore an object of the present invention to provide a pivoted angle sensor suitable for detecting a pivoted angle of a valve axle which can output a signal having a linearly varied characteristic according to a pivotal angular displacement of the valve axle and can improve a durability and a reliablity as the pivoted angle sensor.

The above-described object can be achieved by providing a sensor comprising:

a) a pivotable valve axle arranged so as to be pivoted through a pivoted angle ($\theta 1$, $\theta 2$);

b) a magnet;

c) a first magnetic circuit, magnetically connected to the magnet, through which a first magnetic flux ($\Phi 11$, $\Phi 21$) branched from a total magnetic flux ($\Phi 1$, $\Phi 2$) developed from the magnet is passed;

d) a second magnetic circuit, magnetically connected to the magnet, through which a second magnetic flux ($\Phi 12$, $\Phi 22$) branched from the total magnetic flux ($\Phi 1$, $\Phi 2$) developed from the magnet is passed;

e) a pair of magnetically separated first and second Hall effect devices, the first Hall effect device being interposed in the first magnetic circuit so as to output a first signal according to the first magnetic flux passing therethrough and the second Hall effect device being interposed in the second magnetic circuit so as to output a second signal according to the second magnetic flux passing therethrough; and f) a calculation circuit, in response to the first and second signals of the first and second Hall effect devices, for calculating a level of a detection signal (So1, So2) of the sensor from the first and second signals outputted from the first and second Hall effect devices and for outputting the detection signal, the level of the detection signal being linearly varied according to the pivoted angle of the valve axle.

The above-described object can also be achieved by providing A pivoted angle sensor arranged for detecting a pivoted angle through which a pivotable axle is pivoted thereon, comprising:

a) an envelope defining an enclosed space therein, said space having an approximately circular cross section;

b) a permanent magnet attached onto the pivotable axle elongated normal to a plane formed by the circular cross section of the enclosed space at a center of the circular cross section and having a pair of arcuated outer peripheral end portions which are symmetrical to each other with an axial center of the pivotable axle as a center, each first arc angle intervened between a virtual line passing through one end of the corresponding one of the arcuated outer peripheral end portions and the center and another virtual line passing through the other end of the corresponding one of the arcuated outer peripheral end portions and the center being a first predetermined angle $\theta m1$, $\theta m2$);

c) a plurality of mutually spaced apart arc-shaped magnetic pole pieces, each magnetic pole piece being disposed within the envelope, being extended along a peripheral direction of the envelope so as to magnetically face against said permanent magnet with a constant gap (G1, G2) against the arcuated outer peripheral end portions of the permanent magnet and having a spatial interval of distance (a1, a2) between an elongated end of the corresponding one of the plurality of the magnetic pole pieces and that of the adjacent one of the others of the magnetic pole pieces, and at least one of the arc-shaped magnetic pole pieces having a second arc angle between a virtual line passing through one elongated end of the corresponding one of the plurality of the magnetic pole pieces and the center of the pivotal axle and another virtual line passing through the other elongated end thereof and the center, the second arc angle being a second predetermined angle ($\theta y1$, $\theta y2$), and d) a magnetic-to-electrical transducing circuit which is so constructed and arranged so as to provide a pair of first and second signals developed according to a variation in opposing areas defined between the permanent magnet, spatial intervals of distances between the plurality of the magnetic pole pieces, and the plurality of magnetic pole pieces when the permanent magnet is pivoted with the pivotable axle through an angle (θ1, θ2), said pair of the first and second signal being linearly varied according to the angle (θ1, θ2), and wherein the spatial interval of distance (a1, a2) between each of the plurality of magnetic pole pieces is longer than the constant gap (G1, G2).

BEST MODE FOR CARRYING OUT THE INVENTION

Reference will hereinafter be made to the drawings in order to facilitate a better understanding of the present invention.

(First Embodiment)

FIGS. 1 through 6 show a first preferred embodiment of a sensor arranged for detecting an angular displacement (and its direction) of a valve axle according to the present invention which is applicable to an engine throttle valve opening angle sensor.

Figure 1:
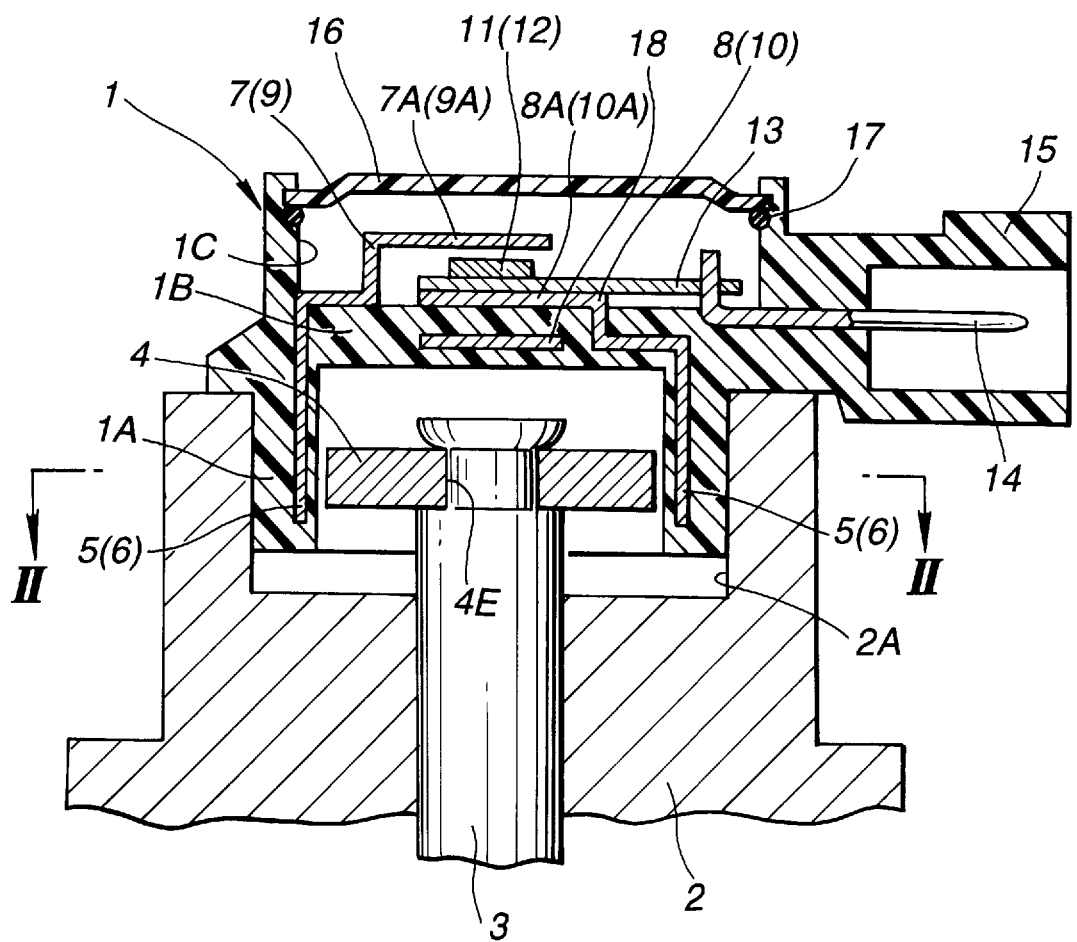
FIG. 1 is a longitudinal cross sectional view of a pivoted angle sensor arranged for detecting a pivoted angle of a valve axle in a first preferred embodiment according to the present invention.

In FIG. 1, a cylindrical casing 1, made of a resin material, encloses a valve axle (pivotable axle) 3 which is a valve axle of the throttle valve. The cylindrical casing 1 includes a cylindrical portion 1A having an opening faced downward as viewed from FIG. 1, a thick flat plate-like side wall portion 1B to lid an upper side of the cylindrical portion 1A, and a concave portion 1C concaved at an upper side portion of the plate-like side wall portion 1B. The cylindrical portion 1A of the casing 1 is inserted into a concave portion 2A of a throttle body 2. It is noted that the valve axle 3 is pivotally disposed on the throttle body 2 which is pivoted and interlocked with a throttle valve (not shown).

A permanent magnet 4 (refer to FIGS. 1 and 2) is disposed within the casing. The magnet 4 is attached on a tip end of the axle 3 by means of a caulking or so forth, and is extended radially from the axle 3. As typically shown in FIG. 2, the permanent magnet 4 has a profile such that a pair of arcuated outer peripheral end portions 4A and 4B in a lateral cross section are provided at elongated respective ends and are symmetrical with each other with an axial center of the valve axle 3 as a center and such that a pair of parallel (straight) line end portions 4C and 4D in the lateral cross section are provided at width-directional ends. The magnet 4, i.e., has an approximately elliptical (or bar) shape in the lateral cross section.

Figure 2:
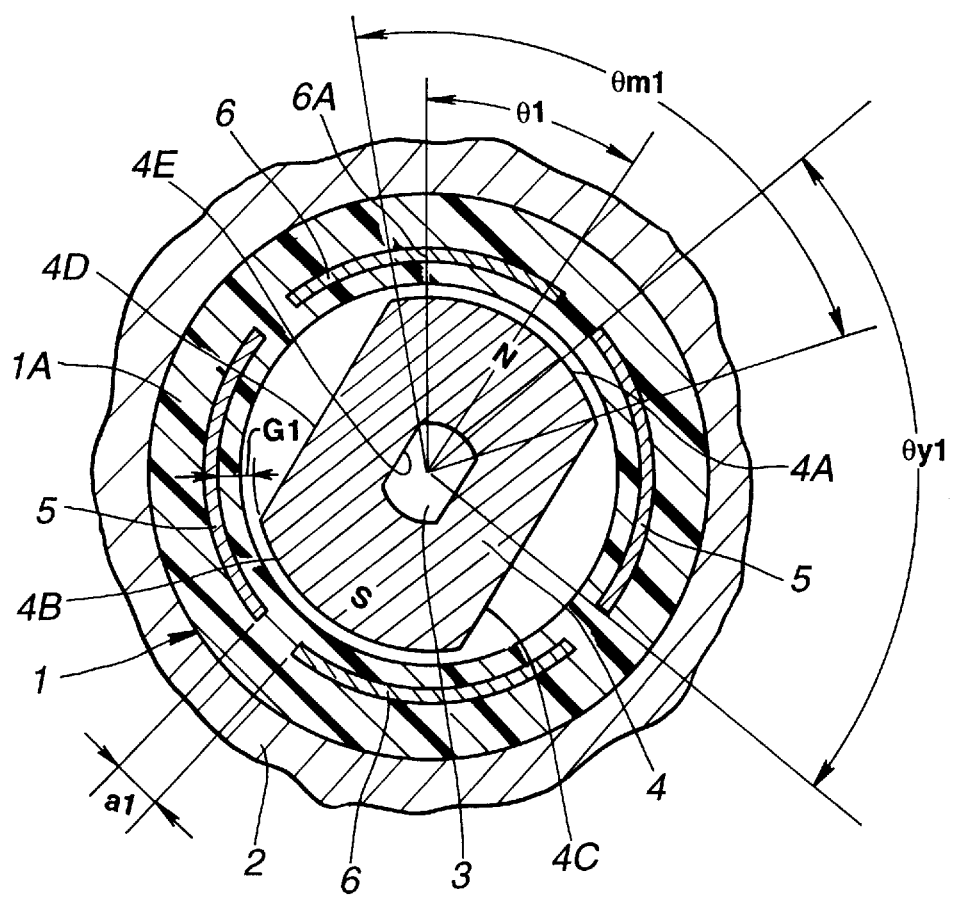
FIG. 2 is an expanded (laterally) cross sectional view cut away along a line II—II of FIG. 1.

In addition, an arc (acute, interior) angle defined between a virtual (phantom) line passing through one end of one of the pair of the arcuated peripheral end portions 4A and the axial center and another virtual line passing through the other end of the one of the pair of the arcuated peripheral end portions 4A is a first predetermined angle θm1. The arc angle of the other of the pair of the arcuated peripheral end portions is also the predetermined angle θm1. The one 4A of the pair of the peripheral end portions provides N (North) magnetic pole located mainly on its peripheral edge, as shown in FIG. 2, and the other 4B of the pair of the peripheral end portions provides S (South) magnetic pole. The magnet 4 is provided with a penetrated hole 4E at a center portion thereof. The penetrated hole 4E is extended along an axial direction of the valve axle 3. The penetrated hole 4E has an analogous shape to the shape of the permanent magnet 4 so as to lock the pivotal movement of the valve axle 3 only, as shown in FIG. 2.

Next, as typically shown in FIG. 2, a pair of arc-shaped first magnetic pole pieces 5 and 5 are buried into the cylindrical portion 1A of cylindrical casing 1 so as to face against each other via the magnet 4. A pair of arc-shaped magnetic pole pieces 6 and 6 are also buried into the cylindrical portion 1A of the cylindrical casing 1 so as to face against each other via the magnet 4. Thus, the two pairs of the arc-shaped first and second magnetic pole pieces 5, 5, 6, and 6 are arranged so as to enclose the magnet 4 like a split circular cylinder form. Then, the pair of the first magnetic pole pieces 5 and 5 are disposed at positions which are symmetrical with each other in the radial direction with the axial center of the valve axle 3 as a center. Each second arc (acute, interior) angle defined between a virtual line passing through one elongated end of each of the pair of the first magnetic pole pieces 5 and 5 and the axial center of the valve axle 3 and another virtual line passing through the other elongated end of each of the pair of the first magnetic pole pieces 5 and 5 and the axial center of the valve axle 3 is a second predetermined angle θy1. Each of the first magnetic pole pieces 5 and 5 is circumferencially extended over the second arc angle θy1 with the axial center of the valve axle 3 as the center so as to face against one of the arcuated peripheral end portions 4A or 4B with a constant gap G1.

It is noted that the second arc angle θy1 of each of the first magnetic pole pieces 5 and 5 is narrower than the first arc angle θm1 that each of the pair of the arcuated outer peripheral end portions 4A and 4B has (θy1≦θm1). It is also noted that each of the arc-shaped first magnetic pole pieces 5 and 5 serves to supply a magnetic flux developed from the permanent magnet 4 to a first Hall effect device 11 (as will be described later) via first and second magnetic path forming portions 7 and 8 (as will be described later).

Furthermore, the other pair of the second arc-shaped magnetic pole pieces 6 and 6 are buried into the cylindrical portion 1A of the casing 1 and are located between the pair of the first arc-shaped magnetic pole pieces 5 and 5 with a spatial interval of distance a1 (θa1 in terms of angular distance) to each adjacent one of the pair of the first arc-shaped magnetic pole pieces 5 and 5. Each of the spatial intervals of the distances al (θa1) is longer than the above-described gap G1.

The pair of the second arc-shaped magnetic pole pieces 6 and 6 are circumferencially extended over the second arc angle of θy1 with the axial center of the valve axle 3 as the center so as to face against each of the arcuated arc-shaped outer peripheral end portions 4A and 4B of the permanent magnet via the constant gap G1.

It is noted that a total arc angle (θy1+2θa1) between one of the pair of the first magnetic pole pieces 5 and 5 and the adjacent one of the pair of the second magnetic pole pieces 6 and 6, both spatial intervals of distances inclusive, is formed to be wider than the first arc angle θm1 of each of the arcuated peripheral end portions 4A and 4B (θm1<θy1+2θa1). In this case, a sum of the angle θy1 through which each of one of the pairs of the first and second magnetic pole pieces 5 and 5 and 6 and 6 is crcumferentially extended and the angle θa1 between one of the pair of the first magnetic pole pieces 5 and 5 and the adjacent one of the pair of the second magnetic pole pieces 6 and 6 is preferably formed to be larger (wider) than the angle θm1 of each arcuated outer peripheral end portion 4A and 4B of the permanent magnet 4.

Each of the pair of the second magnetic pole pieces 6 and 6 serves to supply the magnetic flux developed from the permanent magnet 4 to a second Hall effect device 12 via second magnetic path forming portions 9 and 10 (as will be described later).

It is herein noted that a pivoted angle θ1 through which the permanent magnet 4 is pivotally displaced together with the valve axle 3 is, as shown in FIG. 2, a zero position (θ1=0°) when a center position of the one of the pair of the arcuated peripheral end portions 4A opposes against a center position 6A of the (upper) one of the pair of the second arc-shaped magnetic pole pieces 6 and 6. It is also noted that, as shown in FIG. 2, when the pivotable axle (valve axle 3, i.e., or the permanent magnet 4) is pivoted in a clockwise direction from the center position 6A of the above-described one of the pair of the second magnetic pole pieces 6, this clockwise direction is assumed to be pivoted in a positive direction, and when the valve axle 3 (the permanent magnet 4) is pivoted in a counterclockwise direction from the center position of the above-described one of the pair of the second magnetic pole pieces 6, this counterclockwise direction is assumed to be pivoted in a negative direction.

Referring chiefly to FIG. 1, basic ends of first magnetic path forming portions 7 and 8 are connected to the pair of the first arc-shaped magnetic pole pieces 5 and 5 and tip ends thereof are projected toward a space enclosed by the concave portion 1C. The tip (free, device inserting portion) end of the one of the first magnetic path forming portions 7 covers an upper side of the fist Hall effect device via a gap. The tip end (device inserting portion) of the magnetic path forming portion 8 is disposed over a partition wall portion 1B of the cylindrical casing 1 along a rear surface of a printed circuit board 13 (as will be described later).

Figure 4:
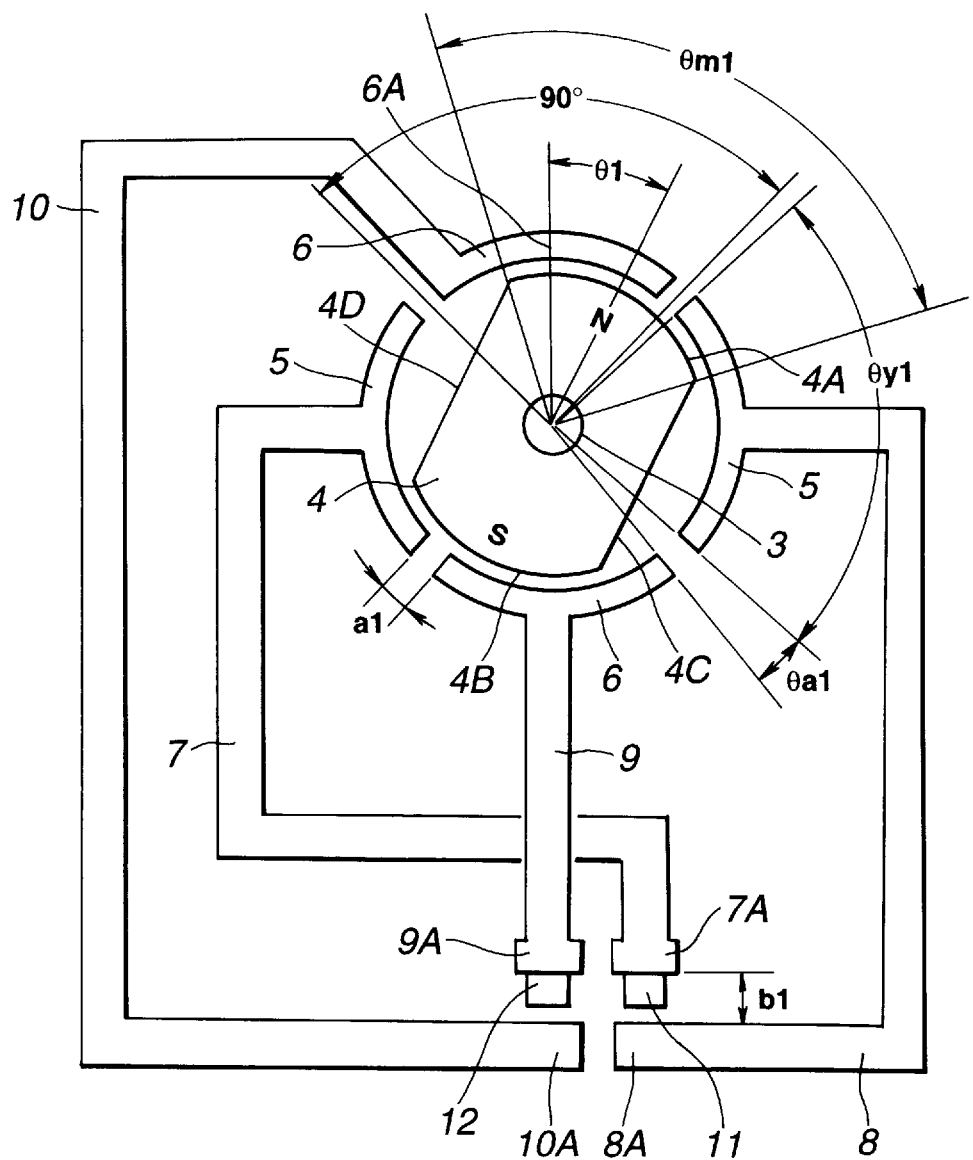
FIG. 4 is an explanatory view of the pivoted angle sensor in the first embodiment representing an arrangement relationship between a permanent magnet, each magnetic pole piece, and each of first and second Hall effect devices.

As typically shown in FIG. 4, the tip end portion 7A (device inserting portion) of the magnetic path forming portion 7 is opposed against the tip end (device inserting portion) 8A of the other of the first magnetic path forming portions 8 located at a lower end of the first Hall effect device 11. The first Hall effect device 11 is interposed between both tip ends 7A and 8A of the first magnetic path forming portions 7 and 8.

The basic ends of the second magnetic path forming portions 9 and 10 are connected to the second magnetic pole pieces 6 and 6, respectively. The tip ends of the second magnetic path forming portions 9 and 10 are projected within the concave portion 1C, as typically shown in FIG. 1.

The tip end (device inserting portion) 9A of the one of the magnetic path forming portions 9 covers over the upper end of the second Hall effect device 12. The tip end 10A (device inserting portion) of the other of the magnetic path forming portion 10 is disposed along the partition side wall portion 1B of the casing 1 over the rear surface of the printed circuit board 13 (as will be described later). Then, the tip end 9A of the one of second magnetic path forming portions 9 is disposed toward the tip end 10A of the other of the second magnetic path forming portions 10 located below the lower end of the second Hall effect device 12 (as will be described later), as typically shown in FIG. 4.

It is noted that an area of the tip end 8A of the one of the first magnetic path forming portions 8 which opposes the same area of the tip end 7A of the other of the first magnetic path forming portions 7 is set to be equal to the area of the tip end 10A of the one of the second magnetic path forming portions 10 which opposes the same area of the tip end 9A of the other of the second magnetic path forming portions 9, as typically shown in FIG. 4.

It is also noted that a spatial interval of distance between both tip ends 7A and 8A of the first magnetic path forming portions 7 and 8 is constant and denoted by b1 in FIG. 4, and the spatial interval of distance b1 is applied equally well to that between both tip ends 9A and 10A of the second magnetic path forming portions 9 and 10.

Figure 3:
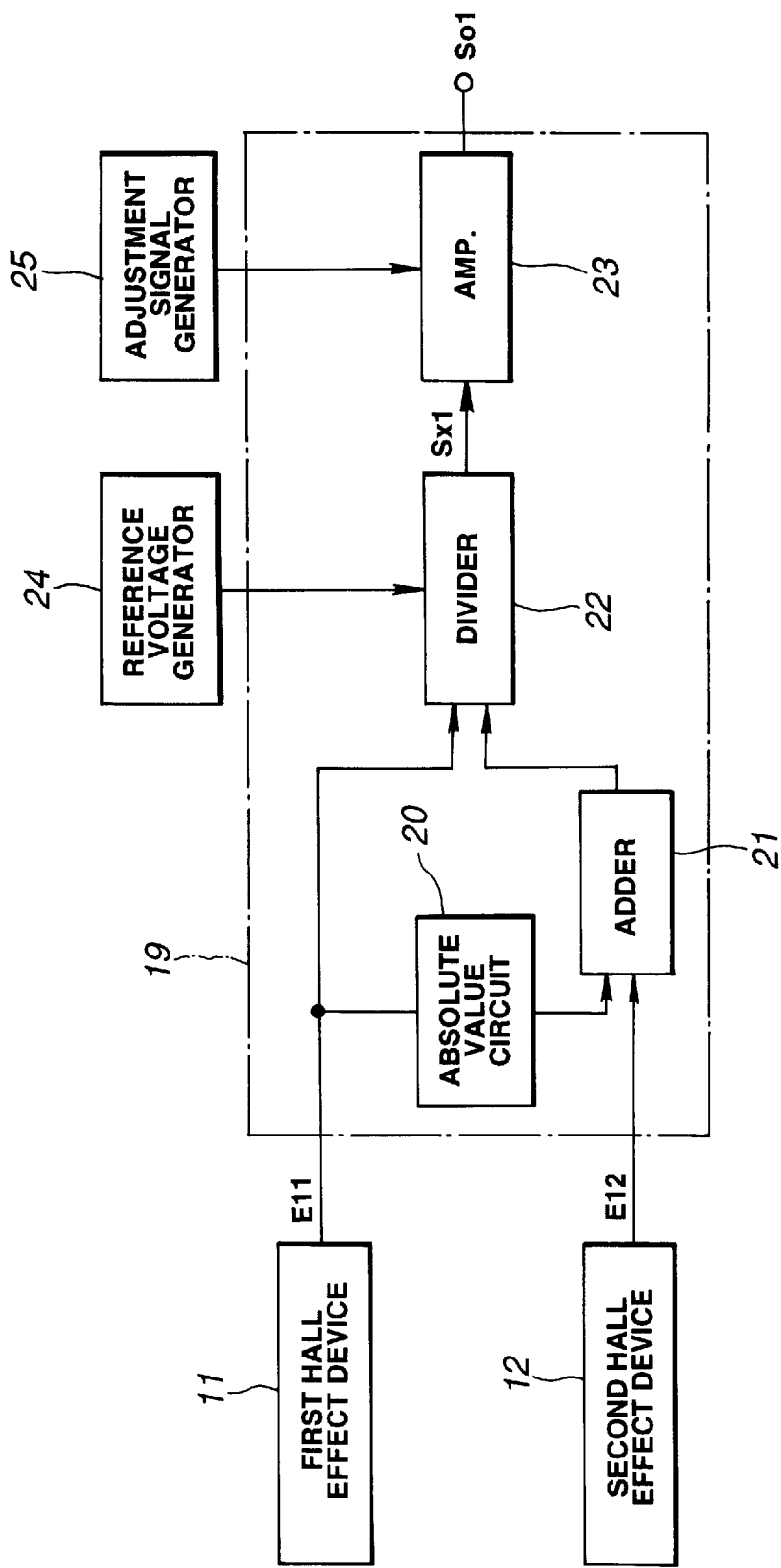
FIG. 3 is an electrical circuit block diagram of a calculation circuit which outputs a detection result of the pivoted angle sensor in the first embodiment shown in FIGS. 1 and 2.

As shown in FIGS. 3 and 4, the first and second Hall effect devices 11 and 12 are equipped on the printed circuit board 13 so as to be parallel to each other and magnetically spaced apart from each other on the printed circuit board 13 in a single chip form.

Figure 5:
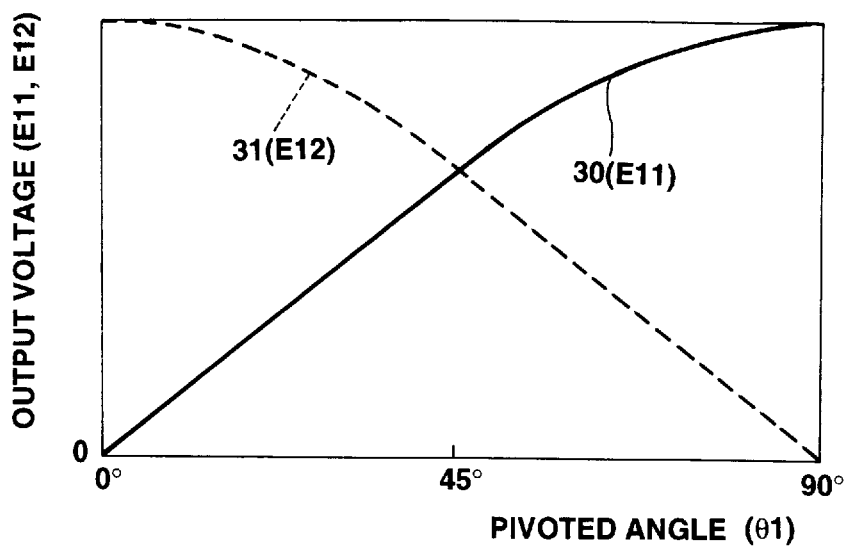
FIG. 5 is a characteristic graph representing output voltage signals from the first and second Hall effect devices used in the first embodiment shown in FIG. 4.

The first Hall effect device 11 is located between both tip ends 7A and 8A of the first magnetic path forming portions 7 and 8, as shown in FIG. 4, so as to output a first signal whose level is approximately proportional to a magnetic flux density developed between both tip ends 7A and 8A of the first magnetic path forming portions 7 and 8 in an output voltage Eli, as denoted by a solid line shown in FIG. 5.

On the other hand, the second Hall effect device 12 is located between both tip ends 9A and 10A of the second magnetic path forming portions 9 and 10 so as to output a second signal whose level is approximately proportional to a magnetic flux density developed between both tip ends 9A and 10A of the second magnetic path forming portions 9 and 10 in another output voltage E12, as denoted by a dotted line shown in FIG. 5.

As typically shown in FIG. 1, the printed circuit board 13 is located within the concave portion 1C of the casing 1. The first and second Hall effect devices 11 and 12 and a calculation circuit 19 (as will be described in detail later) are mounted on a front surface of the printed circuit board 13. The printed circuit board 13 is disposed so that the mounted positions of the first and second Hall effect devices 11 and 12 are positioned between the tip ends 7A, 8A and 9A, 10A of the first and second magnetic path forming portions 7, 8, 9, and 10. A side end of the printed circuit board 13 is provided with one ends of a plurality of terminal pins 14, the terminal pins 14 being penetrated through the side end of the printed circuit board 13 and projected toward a covering 16 at the respective one ends thereof and being projected toward a hole of a male connector 15.

As typically shown in FIG. 1, an intermediate portion of each terminal pin 14 is buried into the casing 1. The respective terminal pins are made of metal.

The respective terminal pins 14 are projected toward the internal hole portion of the male connector 15 so as to be enabled to be connected to an external electrical device. The terminal pins 14 serve to connect the first and second Hall effect devices 11 and 12 and the calculation circuit 19 (and other electrical circuits) to an external (bias) power supply (not shown) and serve to output a detection (calculation) signal So1 (as will be described later) derived from the calculation circuit 19 to an external device such as a control unit. The control unit, for example, includes a microcomputer having an input interface, a CPU, a memory, a common bus, and an output interface. The control unit converts the calculation signal (detection signal) from the calculation circuit 19 via the corresponding terminal pin 14 into a corresponding digital signal and process the digital signal indicating the detection signal in accordance with a stored program.

On the other hand, the male connector 15 is so arranged as to be connected to a female connector (not shown) via the respective terminal pins 14.

The covering 16 is made of a synthetic resin material and is of an approximately flat plate-like covering so as to hermetically seal the concave portion 1C of the casing 1. A packing 17, made of an elastic material, serves to seal between the casing 1 and covering 16.

As typically shown in FIG. 1, a thin, flat plate-like magnetic shield plate 18 is buried into the partition wall portion 1B of the casing 1 and is positioned below the lower ends of the first and second Hall effect devices 11 and 12, so that a magnetic field developed on the permanent magnet 4 is not directly affected on the first and second Hall effect devices 11 and 12 mounted on the printed circuit board 13.

FIG. 3 shows an electrical circuit block diagram of the calculation circuit 19 and its surrounding circuits.

The calculation circuit 19 includes an absolute value circuit 20, an adder 21, a divider 22, and an amplifier 23.

The absolute value circuit 20 functions to take an absolute value of the output voltage E11 of the first Hall effect device 11 as $|E11|$.

The adder 21 adds the output voltage E12 of the second Hall effect device 12 to the absolute value of the output voltage E11 of the first Hall effect device 11 to provide $|E11|+E12$ indicative signal.

The divider 22 functions to divide the output voltage E11 of the first Hall effect device 11 by the output voltage signal of the adder 21 as follows:

$$E11/(|E11|+E12).$$

The amplifier 23 functions to amplify the output voltage of the divider 22 by an amplification factor k.

It is noted that an output end of the amplifier 23 is connected to one of the terminal pins 14 so as to externally output the detection signal So1 corresponding to the pivoted angle of the magnet 4 (valve axle 3) to the external device via the terminal pin 14 in the male connector 15.

As shown in FIG. 3, a reference voltage generator 24 is connected to the divider 22 to determine an offset voltage to the output voltage signal of the divider 22, and an adjustment signal generator 25 is connected to the amplifier 23 to correct a minute variation in the output signal of the amplifier 23, so that an output characteristic of the detection signal of the amplifier 23 is adjusted to provide a linear characteristic for the output detection signal So1 of the amplifier 23.

In FIG. 3, the output voltage signal (denoted by Sx1) of the divider is expressed as follows:

$$Sx1=E11/(|E11|+E12)=\theta 1/90° \quad (1).$$

Figure 6:
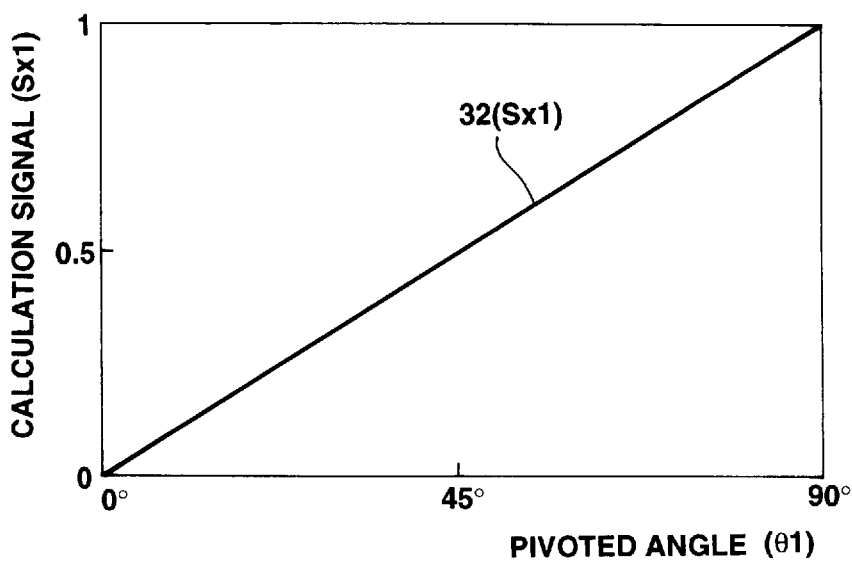
FIG. 6 is a characteristic graph representing a calculation signal Sx1 outputted from the calculation circuit shown in FIG. 3 with respect to the pivoted angle (θ1).

The characteristic line of the output voltage signal of the divider 22 is denoted by a solid line of FIG. 6.

Hence, the calculation signal (output voltage signal of the divider 22) Sx1 gives a minimum value (Sx1=0) when the pivoted angle θ1 described above indicates zero degree (0°) and gives a maximum value (Sx1=1) when the pivoted angle θ1 indicates +90°.

Thus, the calculation signal Sx1 is determined only according to the pivoted angle θ1 and is not affected by a magnetomotive force F1 of the permanent magnet 4 and a device sensitivity G of each of the first and second Hall effect devices 11 and 12.

The detection signal So1 from the amplifier 23 is expressed as follows:

$$\begin{aligned} So1 &= k \cdot Sx1 + Vo1 \\ &= k \cdot \theta 1/90° + Vo1. \end{aligned} \quad (2)$$

In the equation of (2), Vo1 denotes a constant voltage value (for example, 2.5 volts).

Thus, the detection signal which serves as the sensor signal of the opening angle of the throttle valve and which is denoted by So1 gives the minimum value (Vo1−k) when the pivoted angle θ1 indicates −90° and gives the maximum value (Vo1+k) when the pivoted angle θ1 indicates +90°.

Next, a principle of detection on the basis of which the sensor arranged for detecting the angular displacement and its direction in the first preferred embodiment is operated will be described in details with reference to FIGS. 7, 8, 9, 10, and 11.

Figure 7:
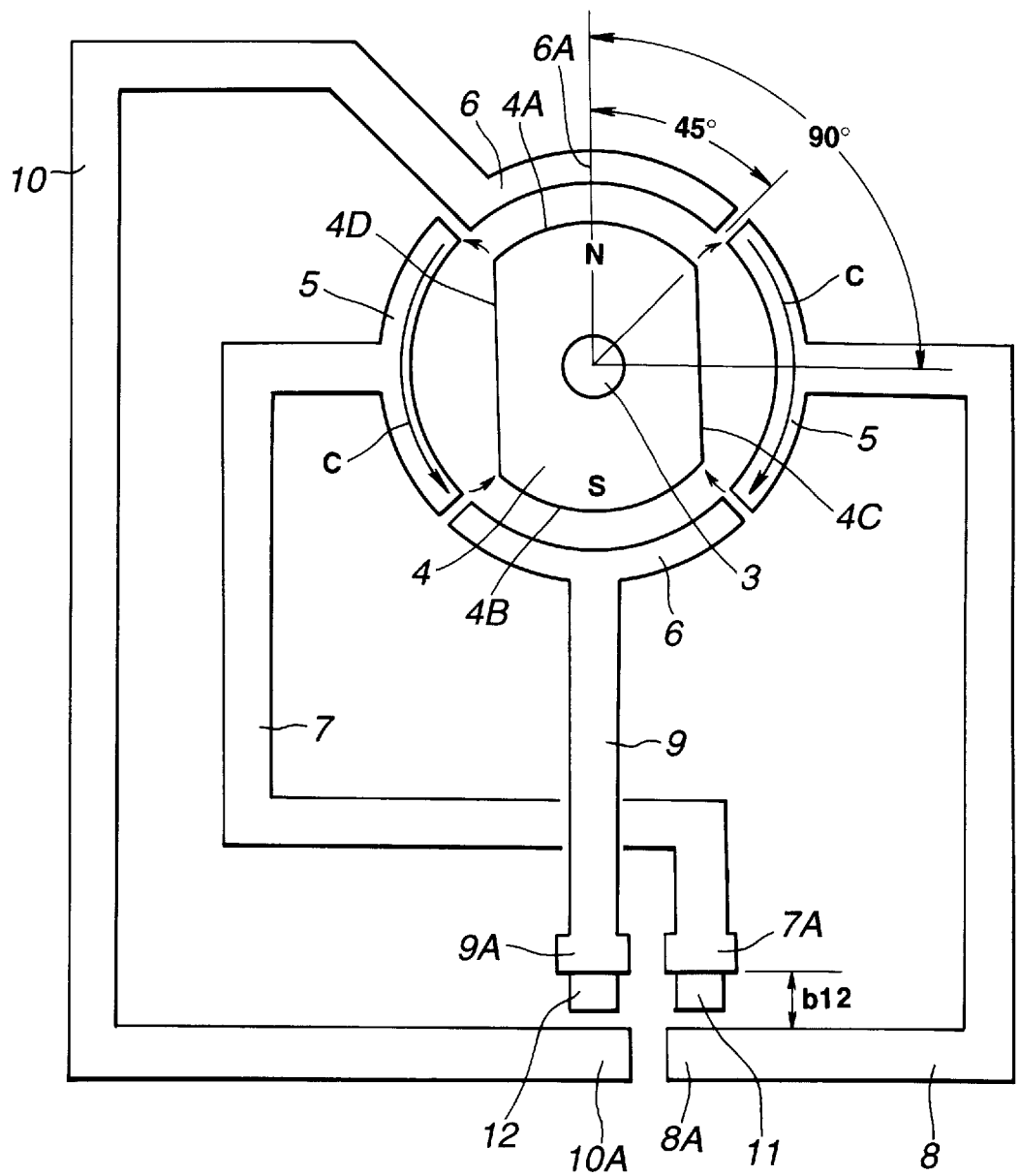
FIG. 7 is an explanatory view for explaining a principle of detection of the pivoted angle in a case of a comparative example to the first embodiment in the same manner as shown in FIG. 4.
Figure 8:
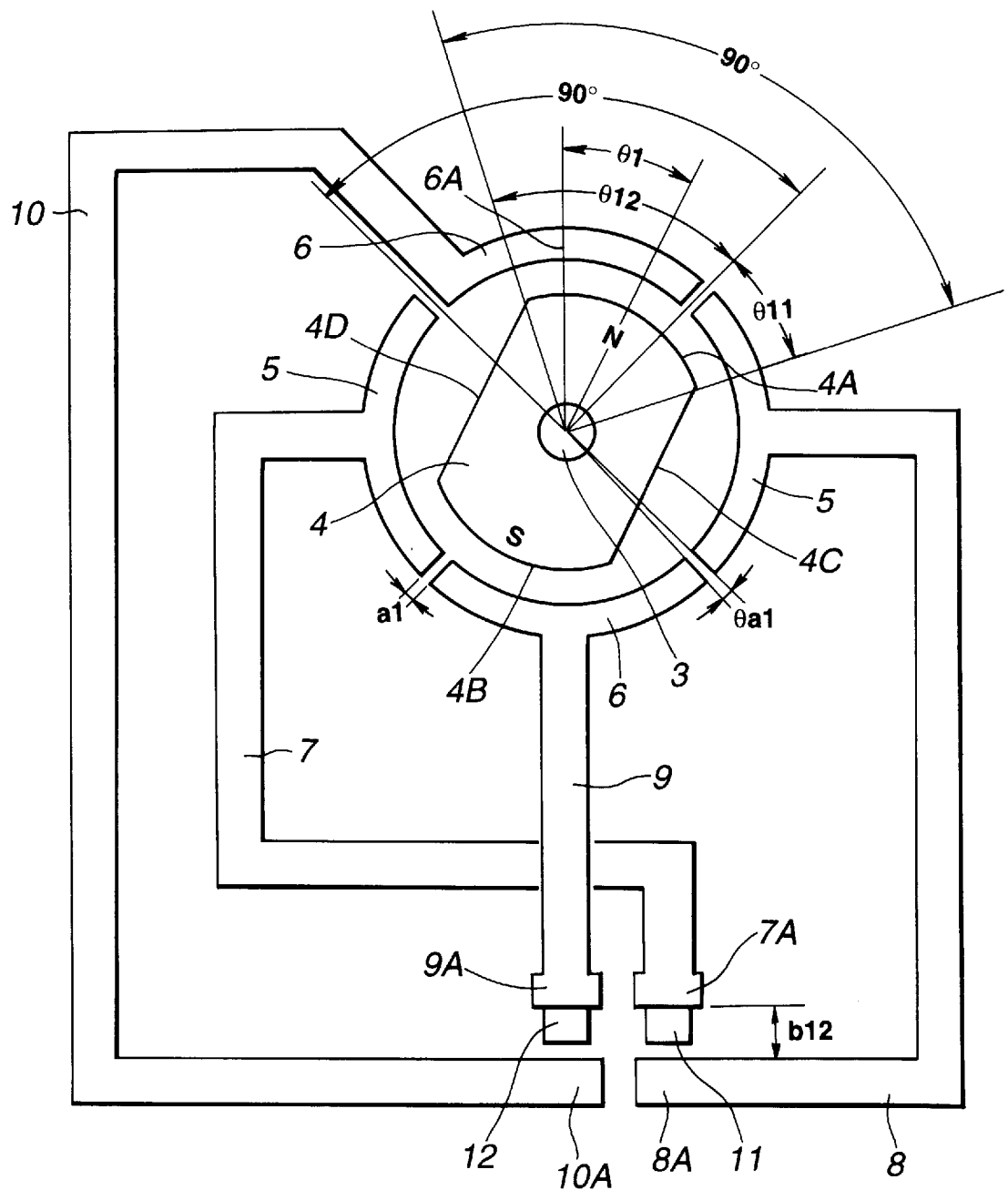
FIG. 8 is an explanatory view for explaining the principle of detection of the pivoted angle in the first embodiment in the same manner shown in FIG. 4 when the permanent magnet has been pivoted.

Suppose, in the case of FIGS. 7 and 8, that the one 4A of the arcuated peripheral end portions of the permanent magnet 4 has the first arc angle θm1 which is set to approximately 90°, and suppose that the second arc angle θy1 of each of the first and second magnetic pole pieces 5, 5, 6, and 6 is set to approximately 90°, and suppose that each spatial interval of distance a1 (angle θa1) between each of the first and second magnetic pole pieces 5, 5, 6, and 6 is set to a very small value.

As shown in FIG. 8, when the valve axle 3 is pivoted, the permanent magnet 4, i.e., the one 4A of the arcuated peripheral end portions 4A and 4B is pivoted in the circumference direction through the pivoted angle θ1 within a range of ±90° with respect to the center portion 6A of the upper one of the second magnetic pole pieces 6 and 6. When the permanent magnet 4 is pivoted in the positive direction, the one 4A of the arcuated peripheral end portions 4A and 4B is partially faced against a upper-side part of the right-side one of the first magnetic pole pieces 5 over an angle of θ11 and, simultaneously, is partially faced against a right-side part of the upper-side one of the second magnetic pole pieces 6 over an angle of θ12.

In addition, the other of the arcuated peripheral end portions 4B is partially faced against a lower-side part of the left-side other of the first magnetic pole pieces 5 over the same angle of θ11 and is partially faced against the left-side part of the lower-side other of the second magnetic pole pieces 6.

Figure 9:
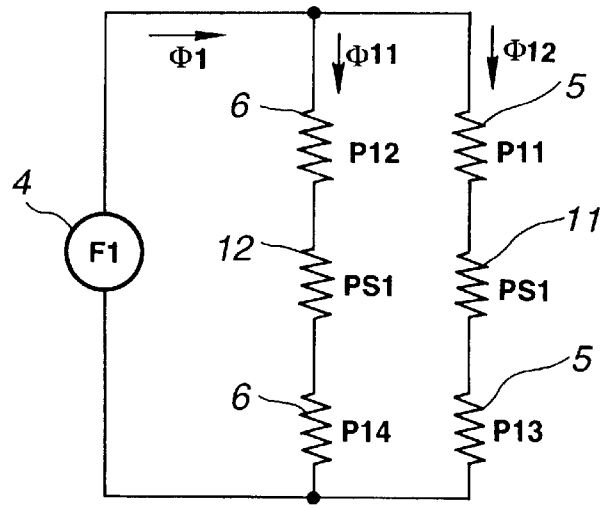
FIG. 9 is a magnetic circuit connection diagram constituted in the case of the first embodiment shown in FIGS. 1 to 6 and 8.

Then, the magnetic flux developed from the permanent magnet 4 flows from the pair of the first magnetic pole pieces 5 and 5 to the first Hall effect device 11 via the first magnetic path forming portions 8 and 7 and flows from the pair of the second magnetic pole pieces 6 and 6 to the second Hall effect device 12 via the second magnetic path forming portions 9 and 10, as show in FIGS. 8 and 9.

At this time, a first magnetic circuit is formed by the permanent magnet 4, the pair of the first magnetic pole pieces 5 and 5, and the first magnetic path forming portions 7 and 8.

Furthermore, a second magnetic circuit is formed by the permanent magnet 4, the pair of the second magnetic pole pieces 6 and 6, and the second magnetic path forming portions 9 and 10.

The first and second magnetic circuits are in a parallel connection relationship.

Suppose that an inverted value of a magnetic resistance generated between the one 4A of the arcuated peripheral end portions of the permanent magnet 4 and the right-side one 5 of the first magnetic pole pieces 5 and 5 as viewed from FIG. 2 is a permeance P11 and the inverted value of the magnetic resistance (magnetic reluctance) generated between the one 4A of the arcuated peripheral end portions of the permanent magnet 4 and the upper-side one 6 of the second magnetic pole pieces 6 and 6 as viewed from FIG. 2 is a permeance P12.

These permeances P11 and P12 are approximately proportional to the opposing area of the one of the arcuated peripheral end portions 4A to the first and second magnetic pole pieces 5 and 6, respectively.

$$P11 = \alpha1 \times \mu0 \times \theta11 \quad (3)$$
$$= \alpha1 \times \mu0 \times \theta1.$$

$$P12 = \alpha1 \times \mu0 \times \theta12 \quad (4)$$
$$= \alpha1 \times \mu0 \times (90° - \theta1).$$

In the equations (3) and (4), α1 denotes a constant predetermined according to a size in the axial direction of the permanent magnet 4, to a size in the axial direction of each magnetic pole piece 5, 5, 6, and 6 and the spatial interval of distance between each of the first and second magnetic pole pieces 5, 5, 6, and 6 and μ0 denotes a permeability.

In addition, suppose that the inverted value of the magnetic resistance generated between the other 4B of the arcuated peripheral end portions 4A and 4B and the left-side other of the first magnetic pole pieces 5 and 5 is the permeance P13 and the inverted value of the magnetic resistance generated between the other 4B of the arcuated peripheral end portions 4A and 4B and the lower-side other of the second magnetic pole pieces 6 and 6 is the permeance P14. These permeances P13 and P14 are expressed in the following equations (5) and (6).

It is noted that the opposing area between the other 4B of the arcuated peripheral end portions 4A and 4B and the others of the first and second magnetic pole pieces 5, 5, 6, and 6 is equal to that between the one 4A of the arcuated peripheral end portions 4A and 4B and the ones of the first and second magnetic pole pieces 5, 5, 6, and 6.

$$P13 = \alpha1 \times \mu0 \times \theta1 = P11 \quad (5)$$
$$P14 = \alpha1 \times \mu0 \times \theta12 = P12 \quad (6)$$

At this time, suppose that each inverted value of the magnetic resistances generated about the respective first and second Hall effect devices 11 and 12 is the permeance PS1. This permeance PS1 is relatively small as compared with the other permeances P11, P12, P13, and P14.

Then, a total magnetic flux Φ1 developed from the magnetomotive force F1 of the magnet 4 and passing through the first and second magnetic circuits is expressed as follows:

$$\Phi1 = F1/\{(1/P11) + (1/P13)\} + F1/\{(1/P11) + (1/P14)\} = \quad (7)$$
$$F1 \cdot (P11 + P12)/2 = F1 \cdot \alpha1 \cdot \mu0 \cdot 90°/2.$$

Therefore, the total magnetic flux Φ1 is always constant.

Furthermore, suppose that a magnetic flux passing through each magnetic pole piece 5, 5, 6, and 6 is denoted by Φ11 and Φ12. The relationship of Φ11 and Φ12 to the permeances P11 and P12 is as follows:

$$\Phi11:\Phi12 = P11:P12.$$

$$\Phi11 = \Phi1 \times P11/(P11 + P12) \quad (8)$$
$$= \Phi1 \times \alpha1 \times \mu0 \times \theta1/(\alpha1 \times \mu0 \times 90°)$$
$$= \Phi1 \times \theta1/90°.$$

$$\Phi12 = \Phi1 \times P12/(P11 + P12) \quad (9)$$
$$= \Phi1 \times \alpha1 \times \mu0 \times (90° - \theta1)/(\alpha1 \times \mu0 \times 90°)$$
$$= \Phi1 \times (1 - \theta1/90°).$$

The magnetic flux B11 passing through the first Hall effect device 11 is derived as follows:

$$B11 = \beta1 \cdot \Phi11 \quad (10).$$

The magnetic flux B12 passing through the second Hall effect device 12 is derived as follows:

$$B12 = \beta1 \cdot \Phi12 \quad (11)$$

In the equations of (10) and (11), β1 denotes a predetermined constant predetermined according to the area of each of the tip ends 7A, 8A, 9A, and 10A of the respective first and second magnetic path forming portions 7, 8, 9, and 10 facing the first and second Hall effect devices.

Since the first Hall effect device 11 and the second Hall effect device 12 have mutually same electrical characteristics and the output voltages E11 and E12 of the first and second Hall effect devices 11 and 12 are proportional to the magnetic densities B11 and B12, the following equations are established.

$$\begin{aligned} E11 &= G \times B11 \\ &= G \times \beta1 \times \Phi1 \times \theta1/90°. \end{aligned} \quad (12)$$

$$E12 = G \times \beta1 \times \Phi1 \times (1 - \theta1/90°). \quad (13)$$

$$E12 = G \times \beta1 \times \Phi1 \times (1 - \theta1/90°) \quad (13).$$

In the equations (12) and (13), G denotes a device sensitivity of each of the first and second Hall effect devices 11 and 12 to determine the output voltages E11 and E12 with respect to the magnetic densities B11 and B12.

It is noted that the output voltage E12 of the second Hall effect device can be expressed as follows:

$$\begin{aligned} E12 &= G \times B12 \\ &= G \times \beta1 \times \Phi1 \times (1 - |\theta1|/90°). \end{aligned} \quad (14)$$

The equation (13) can be replaced with the equation (14).

Consequently, the output voltage E11 of the first Hall effect device 11 has the proportional relationship to the pivoted angle θ1 from the equation (12). That is to say, the output voltage E11 is increased according to the increase in the pivoted angle θ1. In details, when the pivoted angle of θ1 is zero (0°), the first magnetic pole pieces 5 and 5 are not faced toward the arcuated peripheral end portions 4A and 4B of the magnet 4 so that the output voltage E11 indicates approximately zero volts.

When the magnet 4 is pivoted angularly in the clockwise direction from the zero voltage indicated position, the opposing areas of the first magnetic pole pieces 5 and 5 to the pair of the arcuated peripheral end portions 4A and 4B are increased. Thus, the output voltage E11 is increased and when the pivoted angle indicates 90° (θ1=90°), the output voltage E11 indicates the maximum value.

On the other hand, the output voltage E12 of the second Hall effect device 12 has a proportional relationship having a negative gradient between 0° to 90° in the pivoted angle θ1. As the pivoted angle θ1 is increased, the output voltage E12 is decreased.

In detail, since the one 4A of the arcuated peripheral end portions is wholly opposed to the upper-side one of the second magnetic pole pieces 6 and the other 4B of the arcuated peripheral end portions is wholly faced against the lower-side one of the second magnetic pole pieces 6, the output voltage E12 indicates the positive maximum value. When the magnet 4 is pivoted from the above-described position in the clockwise direction, the opposing areas between the arcuated peripheral end portions 4A and 4B and the second magnetic pole pieces 6 and 6 become decreased. Consequently, the output voltage E12 is decreased in proportion to the opposing area. When the pivoted angle θ1 indicates +90°, the output voltage E12 indicates approximately zero volts.

Figure 10:
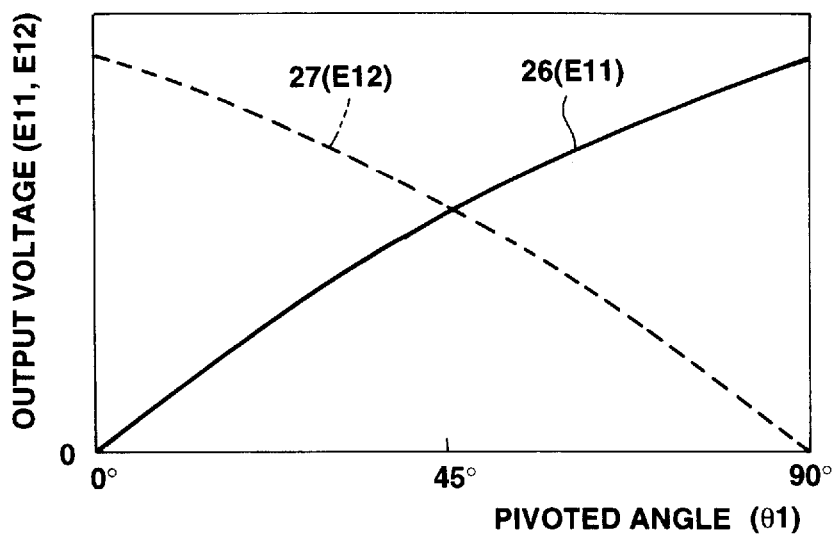
FIG. 10 is a characteristic graph representing a relationship between each output voltage of the first and second Hall effect devices and the pivoted angle (θ1) in the case of each of FIGS. 7 and 8.
Figure 11:
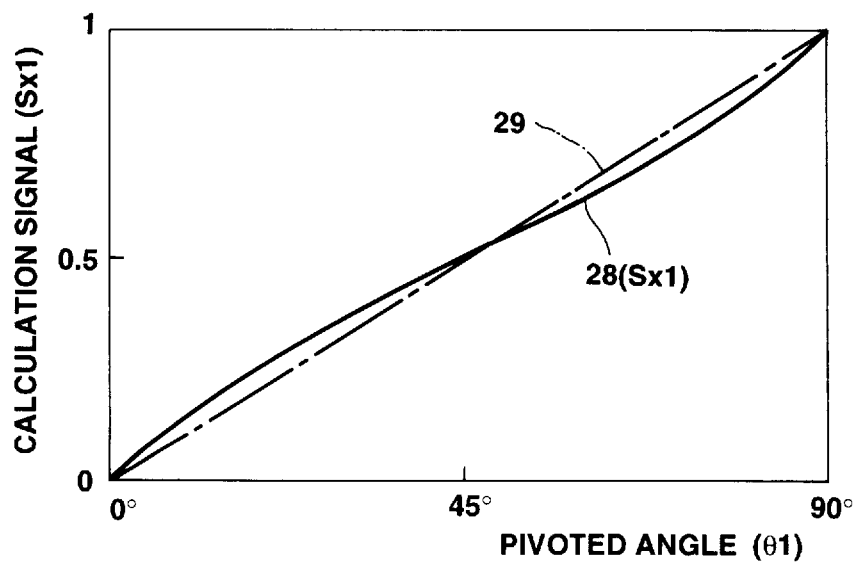
FIG. 11 is a characteristic graph representing a relationship between the calculation signal (Sx1) outputted from the calculation circuit shown in FIG. 3 on the basis of output voltage signals of FIG. 10 and the pivoted angle (θ1).

However, when the spatial interval of distance a1 between the elongated one-end of the one of the first magnetic pole pieces 5 and the elongated one end of the one of the second magnetic pole pieces 6 becomes small, a leakage magnetic flux in an arrow-marked direction C (C in FIG. 7) is easy to occur. In this case, as shown in FIG. 10, each of the output voltages E11 and E12 has no proportional relationship with respect to the pivoted angle θ1. As denoted by the solid characteristic line 26 of FIG. 10, the output voltage E11 of the first Hall effect device 11 is decreased with a relatively high gradient as the pivoted angle θ1 approaches 0°. As the pivoted angle θ1 approaches 90°, the increase (gradient) in the output voltage E11 of the first Hall effect device 11 is suppressed. This tendency is applied equally well to the output voltage E12 of the second Hall effect device as denoted by a dotted line 27 of FIG. 10.

Namely, as shown in FIG. 7, in the comparative case wherein the spatial interval of distance is very small, each of the first arc angle θm1 and the second arc angle θy1 is set to approximately 90°, the output voltages E11 and E12 derived from the first and second Hall effect devices 11 and 12 indicate the characteristic lines 26 and 27 in FIG. 10 due to the leakage magnetic flux in the direction of C in FIG. 7. In this case, the calculation signal Sx1 of the divider 22 in FIG. 3 indicates a characteristic line of 28 in FIG. 11 which is not linear with respect to the pivoted angle θ1. Consequently, there is a large deviation to the linear characteristic line, denoted by a phantom line of 29 in FIG. 11.

Therefore, in the first embodiment described above, the first arc angle θ1 on each of the arcuated peripheral end portions 4A and 4B of the magnet 4 is smaller (narrower) than the total arc angle (θy1+2θa1) between each one of the first magnetic pole pieces and each one of the second magnetic pole pieces, preferably, is smaller (narrower) than the summed angle of the angle θy1 and angle θa1 (θy1+θa1→90°) (θm1<θy1+θa1), and the second arc angle θy1 is narrower than the first arc angle θm1 (θy1<θm1).

Consequently, when the pivoted angle θ1 is at zero degrees or at 90 degrees, the leakage magnetic flux in the direction of C as shown in FIG. 7 between the other of the second magnetic pole pieces 6 which is faced against one of the parallel line end portions 4C or 4D and the magnet 4 or between the other of the first magnetic pole pieces 5 which is faced against the other of the parallel line end portions 4C or 4D and the magnet 4 can be prevented from being developed.

The influence of the leakage magnetic flux on the Hall effect device output signals E11 and E12 can remarkably be reduced.

In addition, in the first embodiment, the gap length G shown in FIG. 2 is set to be shorter than the spatial interval of distance a1 (G1<a1). Hence, each permeance P11, P12, P13, and P14 on the first and second magnetic pole pieces 5 and 6 can considerably be larger than the permeance PS1 around each of the first and second Hall effect devices 11 and 12. An influence of the permeance PS1 on the output voltages E11 and E12 of the first and second Hall effect devices 11 and 12 can be reduced (suppressed). Consequently, the influence of the leakage magnetic flux on the Hall effect outputs E11 and E12 can be reduced in the same way as described above.

Consequently, the output voltages E11 and E12 from the respective Hall effect devices 11 and 12 indicate linear characteristic lines 30 and 31 in FIG. 5. For example, as the pivoted angle θ1 approaches 0°, the output voltage E11 of the first Hall effect device 11 is not decreased with a large gradient. As the pivoted angle approaches +90°, the output voltage E12 of the second Hall effect device 12 is not decreased with the large gradient.

Furthermore, the calculation signal (output voltage of the divider 22) Sx1 indicates the linear characteristic 32 in FIG. 6 which is proportional to the pivoted angle θ1.

In the first embodiment, since the first and second magnetic pole pieces 5, 5, 6, and 6 do not contact against the pivotable valve axle 3 and magnet 4, the detection of the opening angle (pivoted angle) is possible without application of an extra slide resistance (load) to the valve axle 3. Since the sensor in the first embodiment is of a non-contact type, a durability of the sensor can be improved. In addition, since the output voltages of the first and second Hall effect devices are not instantaneously interrupted due to non-mechanical contact of the pole pieces on the magnet 4, a high reliability can be assured.

In addition, since the detection signal So1 is outputted from the calculation circuit 19 which corresponds to the pivoted angle θ1 as expressed in the equation (2), an accurate detection of the pivoted angle θ1 is possible according to the detection signal of So1 without dependence on the magnetomotive force F1 of the magnet 4, the temperature characteristic of the device sensitivity G, the aging effect on the magnet and Hall effect devices.

Since the magnetic flux developed from the magnet 4 is effectively introduced from the first magnetic pole pieces 5 and 5 into the first Hall effect device via the first and second magnetic path forming portions 7 and 8 and is effectively introduced from the second magnetic pole pieces 6 and 6 into the second Hall effect device 12 via the second magnetic path forming portions 9 and 10, the first Hall effect device 11 can output the output voltage E11 which corresponds to the magnetic flux Φ11 derived from the magnet 4 and developed between the first magnetic pole pieces 5 and 5. The second Hall effect device 12 can output the output voltage E12 which corresponds to the magnetic flux Φ12 derived from the magnet 4 and developed between the second magnetic pole pieces 6 and 6. The levels of the output voltages E11 and E12 developed from the first and second Hall effect devices 11 and 12 can largely be varied according to the pivoted angle θ1 of the magnet 4.

A mounting freedom of each of the first and second Hall effect devices 11 and 12 can be increased. Since the first and second Hall effect devices are mounted on the printed circuit board 13, mutually adjoined to each other, an ambient temperature condition can be identical to each other. The single chip Hall effect devices on the same semiconductor substrate can be used.

On the other hand, since the first and second magnetic pole pieces 5, 5, 6, and 6 are disposed concentrically with the valve axle as a center and are wholly in the slit cylindrical shape, the distance between the arcuated peripheral end portions 4A and 4B and the respective first and second magnetic pole pieces 5, 5, 6, and 6 when opposed can be maintained constant, i.e., the gap G can be maintained constant.

Thereby, the magnetic flux Φ11 which is proportional to the opposing area at which each of the first magnetic pole pieces 5 and 5 and each of the arcuated peripheral end portions 4A and 4B of the magnet 4 are disposed can be introduced from the first magnetic pole pieces 5 and 5.

The output voltage E11 which is proportional to the pivoted angle θ1 can be derived from the first Hall effect device 11 which is interposed between the tip ends 7A and 8A of the magnetic path forming portions 7 and 8 connected to the first magnetic pole pieces 5 and 5.

The output voltage E12 which is proportional to the pivoted angle θ1 can also be derived from the second Hall effect device 12 since the magnetic flux Φ12 which is proportional to the opposing area at which each of the arcuated peripheral end portions 4A and 4B and each of the second magnetic pole pieces 6 and 6 are opposed can be introduced from the second magnetic pole pieces 6 and 6.

The second Hall effect device 12 is interposed between the tip ends 9A and 10A of the second magnetic path forming portions 9 and 10 connected to the second magnetic pole pieces 6 and 6.

Since the magnet 4 and the respective first and second magnetic pole pieces 5, 5, 6, and 6 are disposed concentrically, the sensor can be compacted.

Since the magnet 4 can only be fixed onto the valve axle 3 which is to be pivoted, the assembly operation of the sensor can be simplified.

In the first embodiment, since the length of the gap G1 is shorter than each of the spatial intervals of distances a1 (angle θa1) (G1<a1), each permeance P11, P12, P13, P14 at the first and second magnetic pole pieces 5, 5, 6, and 6 can considerably be larger than the permeance PS1 surrounding each of the first and second Hall effect devices 11 and 12. Hence, the influence of the permeance PS1 on the output voltage values E11 and E12 of the first and second Hall effect devices 11 and 12 can negligibly be reduced.

In the first embodiment, since θm1<θy1+2θa1, θy1+θa1→90°, θm1<θy1+θa1, and θy1<θm1, the leakage magnetic flux between the parallel line end portions 4C and 4D and the other of the second magnetic pole pieces 6 or the other of the first magnetic pole pieces 5 can be prevented from being developed. The influence of the leakage magnetic flux on the detection signal can remarkably be reduced.

(Second Embodiment)

FIGS. 12 through 15 show a second preferred embodiment of the sensor arranged for detecting the pivoted angle and its direction according to the present invention.

Since the same reference numerals as those used in the first embodiment designate the corresponding elements in the first and second embodiments, the detailed explanation thereof will be omitted herein.

The difference between the first and second embodiments lies chiefly on the number of the magnetic pole pieces surrounding the magnet 41.

Figure 12:
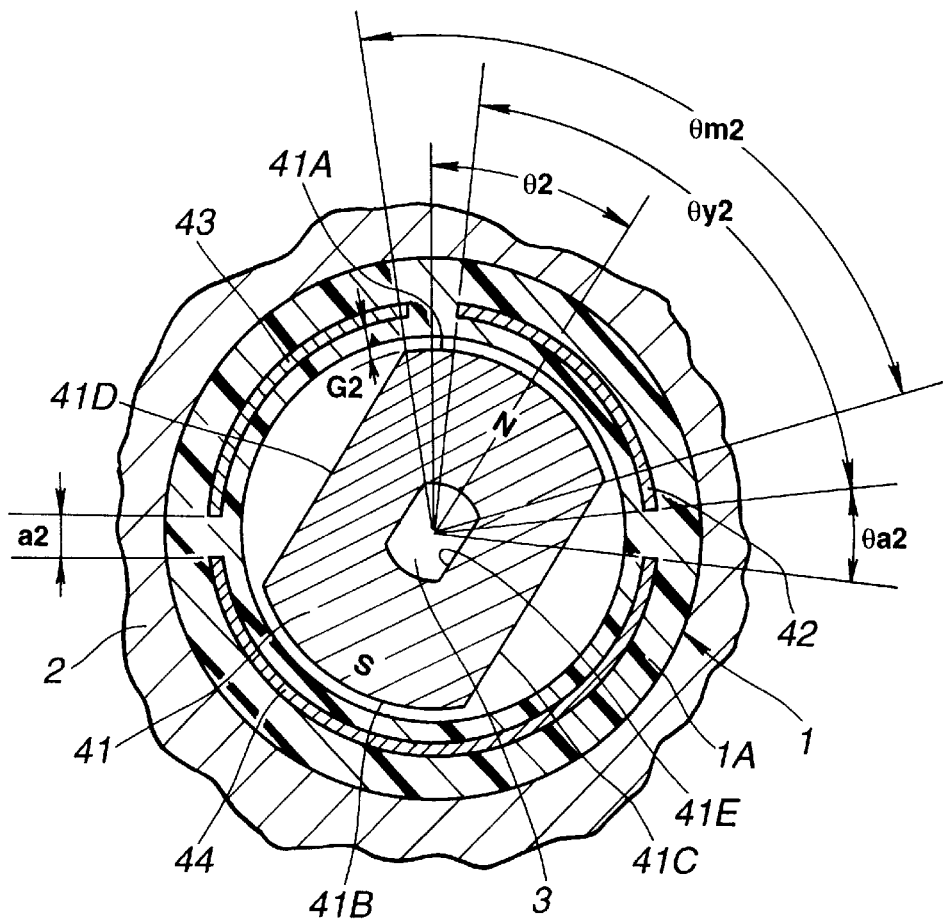
FIG. 12 is an expanded cross sectional view of the pivoted angle sensor in a second preferred embodiment according to the present invention.

As typically shown in FIG. 12, the elongated magnet 41 is disposed within the cylindrical portion 1A of the casing 1 and is attached onto the end of the valve axle 3 by means of the caulking. The magnet 41 is provided with the parallel line portions 41C and 41D and the arcuated peripheral end portions 41A and 41B, as in the first embodiment.

The arcuated peripheral end portions 41A and 41B has the first arc (acute) angle θm2 (which is slightly narrower than 90 degrees with the axial center of the valve axle 3 as the center).

The arcuated peripheral end portions 41A and 41B are provided with the N pole and S pole respectively as shown in FIG. 12.

The penetrating hole 41E is provided at the center of the magnet 41 so as to receive the axial end portion of the valve axle 3. The shape of the penetrating hole 41E is analogous to that of the magnet 41.

In the second embodiment, the first magnetic pole piece 42 is buried into the cylindrical portion 1A of the casing 1. The first magnetic pole piece 42 is of the split cylindrical shape together with a second and third magnetic pole piece 43 and 44 (as will be described later) so as to enclose the magnet 41 in the circular shape.

The first magnetic pole piece 42 is extended circumferencially over the second arc angle θy2 which is narrower than the first arc angle θm2 with the gap G2 provided against the one of the arcuated peripheral end portions 41A which provides the N magnetic pole of the magnet 41 and with the axle 3 as the center.

In the second embodiment, with reference to FIG. 12, the angle (θy2+2θa2) over the first magnetic pole piece 42 and the two spatial intervals of the distances from the first magnetic pole piece 42 to the adjacent second and third magnetic pole pieces 43 and 44 is wider than each first arc angle θm2 on the respective arcuated peripheral end portions 41A and 41B (θm2<θy2+2θa2). It is preferable that θm2< (θy2+θa2).

The first magnetic pole piece 42 functions for the magnetic flux developed from the magnet 41 to be introduced into the first Hall effect device 48 via the first magnetic path forming portion 45.

The second magnetic pole piece 43 is buried into the cylindrical portion 1A and is provided with the same spatial interval of the distance a2 (angle θa2) which is larger than the gap G2 from the adjacent first magnetic pole piece 42. The second magnetic pole piece 43 has the same first arc angle θy2 as the first magnetic pole piece 42 which is narrower than the second arc angle θm2. The second magnetic pole piece 43 is extended circumferencencially over the first arc angle θy2 and is faced against the one 41A of the arcuated peripheral end portions 41A and 41B magnet 4 with the constant gap G2 therebetween with the valve axle 3 as the center. The second magnetic pole piece 43 serves to introduce the magnetic flux generated from the magnet 41 to the second Hall effect device 49 via the second magnetic path forming portion 45.

The third magnetic pole piece 44 is extended circumferencially along the buried cylindrical portion 1A of the casing 1 with the spatial interval of distance a2 to the adjacent first and second magnetic pole pieces 42 and 43 provided. The length of the spatial interval of distance a2 is longer than the gap G2. It is noted that the second arc angle in the case of the third magnetic pole piece 44 is approximately set to 180°.

The third magnetic pole piece 44 introduces the magnetic flux developed from the magnet 41 into the first and second Hall effect devices 48 and 49 via the third magnetic path forming portion 47.

It is noted that the pivoted angle θ2 of the magnet 41 (valve axle 3) is 0° (θ2=0°) when the center portion of the one of the arcuated peripheral end portions 41A and 41B is faced against the spatial interval of distance a2 between the first and second magnetic pole pieces 42 and 43. When the magnet 4 is pivoted toward the first magnetic pole piece 42 from the above-described position of zero, the pivoted direction is defined as the positive direction. When the magnet 4 is pivoted toward the second magnetic pole piece 43 from the zero pivoted position, the pivoted direction is defined as the negative direction.

The first magnetic path forming portion 42 has the basic end portion which is connected to the first magnetic pole piece 42 and has the free (tip end) portion which is projected toward the concave portion 1C of the casing 1.

The tip end portion of the first magnetic path forming portion 42 encloses the upper side of the first Hall effect device 48 via the clearance and faces against the tip end of the third magnetic path forming portion 47 located below the lower side of the first Hall effect device 48.

The second magnetic path forming portion 46 has the basic end portion connected to the second magnetic pole piece 43 and its tip end portion projected into the concave portion 1C of the casing 1. The tip end portion of the second magnetic path forming portion 46 encloses the upper side of the second Hall effect device 49 with the clearance and faces against the tip end of the third magnetic path forming portion 47 located below the lower side of the second Hall effect device 49.

The tip end (device inserting) portions 45A and 46A of the magnetic path forming portions 45 and 46 are opposed against the tip end portion 47A of the third magnetic path forming portion 47 at mutually the same opposing areas. Each of the clearances between these tip end portions is set to a constant value of b2.

Figure 14:
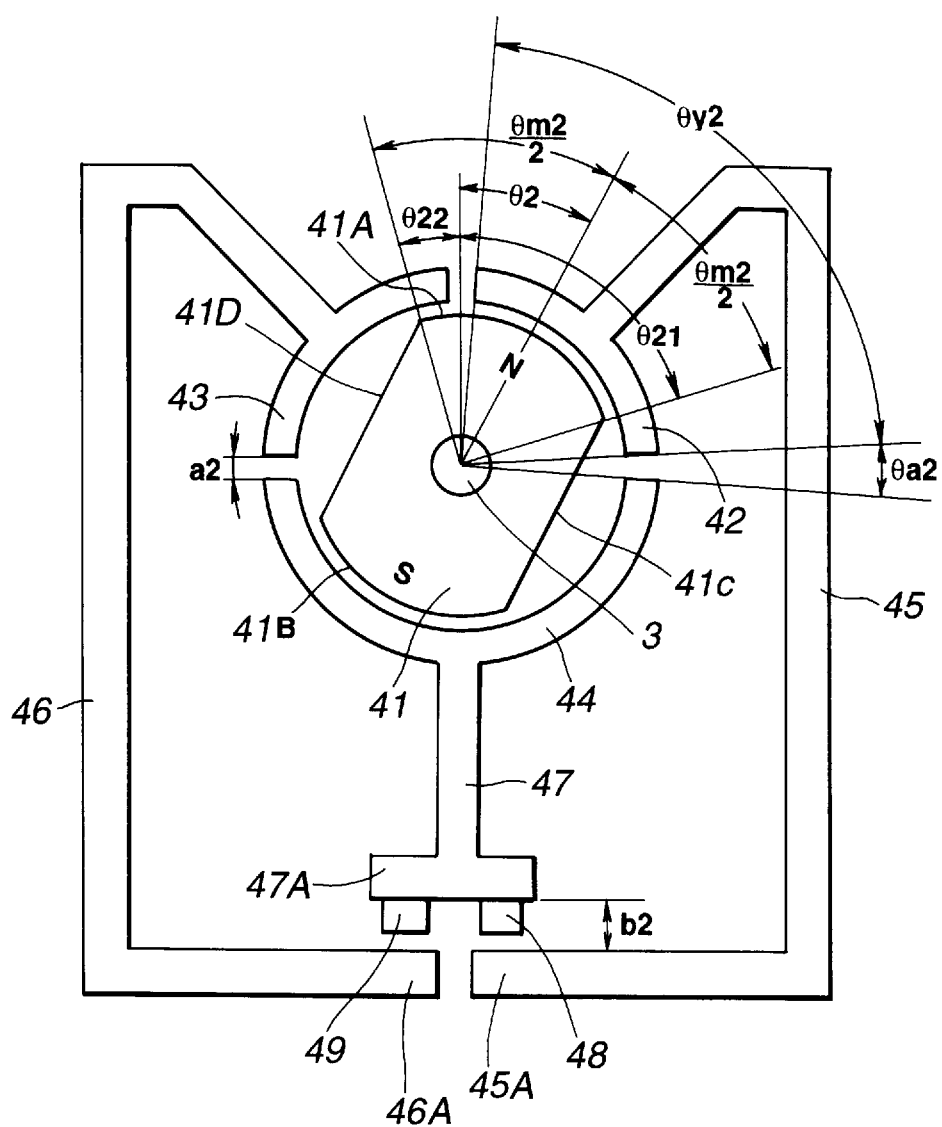
FIG. 14 is an explanatory view for explaining the principle of detection of the pivoted angle in the case of the second embodiment shown in FIG. 12.

The basic end portion of the third magnetic path forming portion 47 is connected to the third magnetic pole piece 44, the tip end thereof being projected into the concave portion 1C of the casing 1. The tip end portion of the third magnetic path forming portion 47 is extended along the rear surface of the printed circuit board 13 and over the partition side wall portion 1B of the casing 1. The tip end (device inserting) portion 47A of the third magnetic path forming portion 47 is opposed against the tip end (device inserting) portions 45A and 46A of the first and second magnetic path forming portions 45 and 46 as shown in FIG. 14. Each of the first and second Hall effect devices 48 and 49 is interposed between these tip end portions 45A and 47A and 46A and 47A.

The first and second Hall effect devices outputs the voltage signals E21 and E22 which are proportional to the magnetic density between the tip end portions of 45A and 47A of the first and second magnetic path forming portions and which are proportional to the magnetic density between the tip end portions 46A and 47A of the second and third magnetic path forming portions 46 and 47, respectively.

Figure 13:
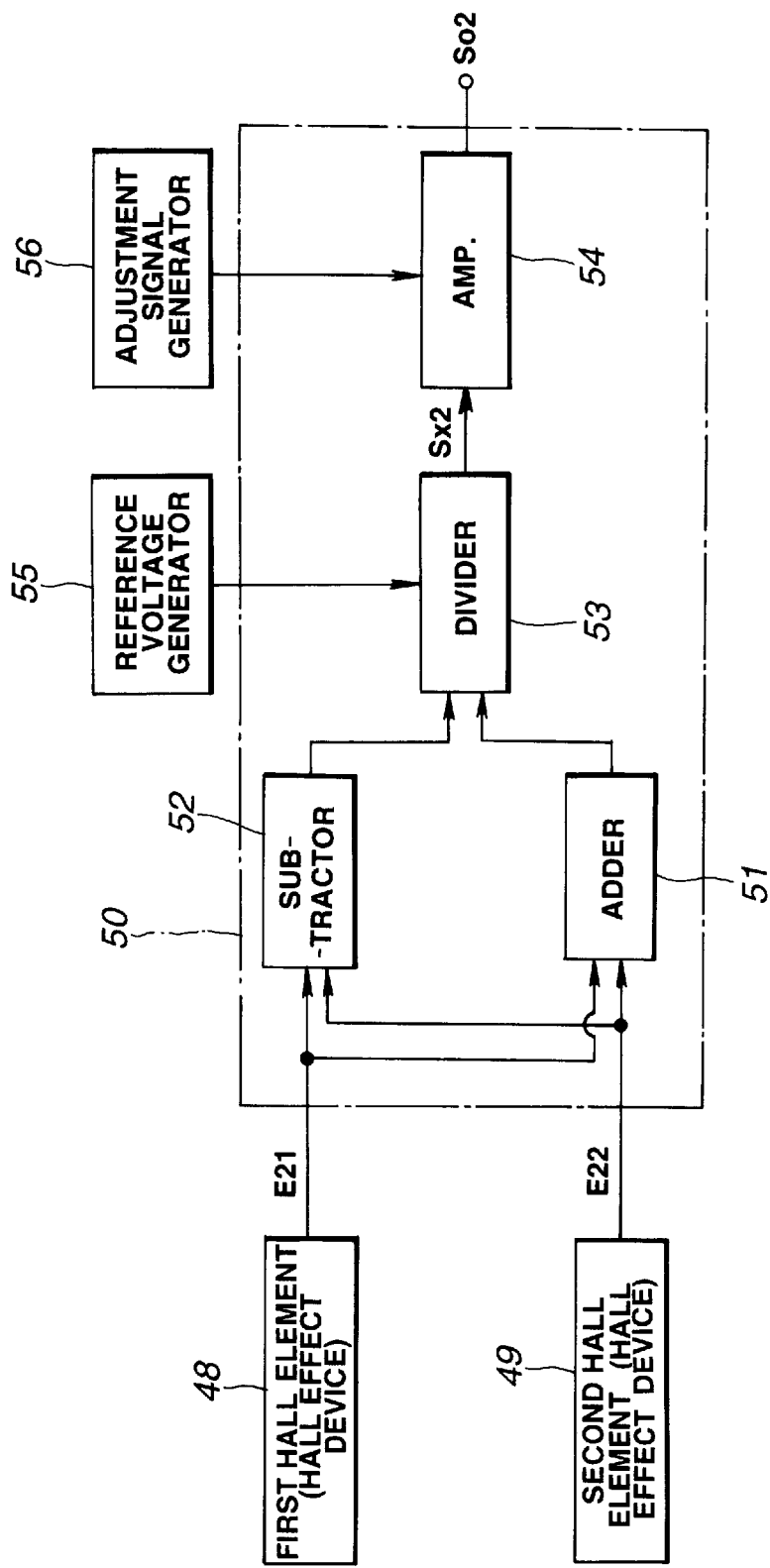
FIG. 13 is an electrical circuit block diagram of the calculation circuit in the case of the second embodiment shown in FIG. 12.

The calculation circuit 50, as shown in FIG. 13, includes the subtractor 52, the adder 51, divider 53, and the amplifier 54. The calculation circuit is mounted on the printed circuit board 13. The calculation circuit 50 calculates and outputs the detection signal So2 which corresponds to the pivoted angle θ2 on the basis of the output voltage signals E21 and E22 outputted from the first and second Hall effect devices 48 and 49.

The adder 51 adds the output voltage signals E21 and E22 from the first Hall effect device (first Hall element in FIG. 13) 48 and from the second Hall effect device (second Hall element in FIG. 13) 49 to derive E21+E22.

The subtractor 52 subtracts the second output voltage signal E22 of the second Hall effect device 49 from the first output voltage signal E21 of the first Hall effect device 48 as follows: E21−E22.

The divider 53 functions to divide the output signal of the subtractor 52 by the output signal of the adder 51 as follows:

$Sx2=(E21-E22)/(E21+E22)=2/90°×θ2.$

The amplifier 54 amplifies the output signal of the divider 53 to provide the detection signal So2 for the corresponding terminal pin 14 as in the same way as in the case of the first embodiment.

The reference voltage generator 55 serves to supply the reference voltage signal to the divider 53 to determine the offset level of the output signal of the divider 53 and the adjustment signal generator 56 corrects the minute variation in the output detection signal of So2 from the amplifier 54 so as to adjust the output characteristic of the signal in the wholly linear form.

Next, the principle of detection of the pivoted angle and its direction in the case of the second preferred embodiment will be described with reference to FIGS. 12 through 15.

To facilitate a better understanding of the detection principle of the sensor in the second embodiment, the first arc angle θm2 concerning the one 41A of the arcuated peripheral end portions 41A and 41B is set to approximately 90 degrees, the second arc angle θy2 on each of the first and second magnetic pole pieces 42 and 43 is approximately set to 180 degrees, and each spatial interval of distances a2 (θa2) is very small. On these prerequisites, equations (15) to (24) are introduced.

First, as shown in FIG. 14, together with the pivotal movement of the valve axle 3, the one 41A of the arcuated peripheral end portions 41A and 41B is simultaneously pivoted in the circumference direction from the position at which the N pole thereof is faced against the spatial interval of the distance between the first and second magnetic pole pieces 42 and 43 over the range of ±45°.

At this time, one 41A of the arcuated peripheral end portions 41A and 41B is faced against the first magnetic pole piece 42 over the range of the angle θ21 and is faced against the second magnetic pole piece 43 over the angle of θ22.

On the other hand, the other 41B of the arcuated peripheral end portions 41A and 41B of the magnet 41 is wholly faced against the third magnetic pole piece 44. While the magnetic flux developed by the magnet 41 is introduced from the first and third magnetic pole pieces 42 and 43 to the first Hall effect device 48 via the first and third magnetic path forming portions 45 and 47, the magnetic flux from the second and third magnetic pole pieces 43 and 44 is introduced into the second Hall effect device 49 via the second and third magnetic path forming portions 46 and 47.

At this time, the first magnetic circuit is formed by the magnet 41, the first and third magnetic pole pieces 42 and 44, and the first and third magnetic path forming portions 45 and 47 and the second magnetic circuit is formed by the magnet 41, the second and third magnetic pole pieces 43 and 44, and the second and third magnetic path forming portions 46 and 47. These two magnetic circuits are connected to the magnet 41 in parallel to each other.

Figure 15:
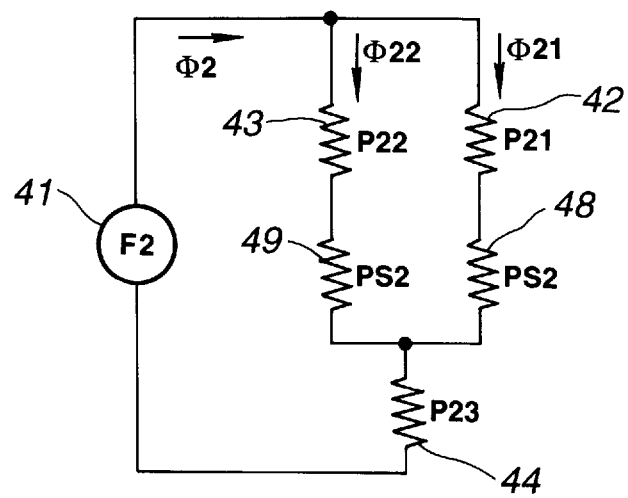
FIG. 15 is a magnetic circuit connection diagram of the magnet, each magnetic pole piece, and each of the first and second Hall effect devices in the case of the second preferred embodiment shown in FIG. 12.

This is appreciated from FIG. 15.

The inverted values (inversion) of the magnetic resistance generated between the one 41A of the arcuated peripheral end portions 41A and 41B of the magnet 41 and the first and second magnetic pole pieces 42 and 43 are the permeances P21 and P22. These permeances P21 and P22 are approximately proportional to the opposing areas at which the one 41A of the arcuated peripheral end portions 41A and 41B of the magnet 41 is faced against the first and/or second magnetic pole pieces 42 and/or 43.

$$P21 = \alpha2 \cdot \mu0 \cdot \theta21 \qquad (15)$$
$$= \alpha2 \cdot \mu0 \cdot (45° + \theta2).$$

$$P22 = \alpha2 \cdot \mu0 \cdot \theta22 \qquad (16)$$
$$= \alpha2 \cdot \mu0 \cdot (45° - \theta2).$$

In the equations (15) and (16), α2 denotes the constant determined according to the axial dimension of the magnet 4, the spatial distance of the respective first and second magnetic pole pieces 42 and 43, and the length of the gap G between the magnet 41 and the respective magnetic pole pieces 42 and 43.

In addition, the inverted value (inversion) of the magnetic resistance generated between the other of the arcuated peripheral end portions 41A and 41B and the third magnetic pole piece 44 is the permeance P23. The permeance P23 is derived as follows since the other 41B of the arcuated peripheral end portions 41A and 41B is always faced against 90 degrees. On the other hand, the one of the arcuated peripheral end portions 41A of the magnet 41 is always faced over 90 degrees against the second magnetic pole piece 43.

Then, the permeance P23 gives $$P23 = \alpha2 \cdot \mu0 \cdot 90° = P21 + P22 \qquad (17).$$

The inverted value (inversion) of the magnetic resistance generated around the first and second Hall effect devices 48 and 49 is the permeance PS2. The permeance PS2 is relatively small as compared with the other permeances P21 and P22.

The magnet 41 has the magnetomotive force F2.

The total magnetic flux Φ2 passing through the first and second magnetic circuits is expressed as follows:

$$\begin{aligned}\Phi2 &= F2 \times 1/\{1/(P21 + P22) + 1/P23\} \qquad (18)\\ &= F2 \times P23/2\\ &= F2 \times \alpha2 \times \mu0 \times 90°/2.\end{aligned}$$

The total magnetic flux Φ2 is, thus, always constant value.

The magnetic fluxes Φ21 and Φ22 passing through the respective first and second magnetic pole pieces 42 and 43 have the following relationship:

$$\Phi21:\Phi22 = P21:P22.$$

$$\begin{aligned}\Phi21 &= \Phi2 \cdot P21/(P21+P22) \qquad (19)\\ &= \Phi2 \times (\alpha2 \times \mu0 \times (45° + \theta2))/(\alpha2 \times \mu0 \times 90°)\\ &= \Phi2 \cdot (0.5 + \theta2/90°).\end{aligned}$$

$$\begin{aligned}\Phi22 &= \Phi2 \times P22/(P21+P22) \qquad (20)\\ &= \Phi2 \times (\alpha2 \times \mu0 \times (45° - \theta2))/(\alpha2 \times \mu0 \times 90°)\\ &= \Phi2 \times (0.5 - \theta2/90°).\end{aligned}$$

The magnetic flux densities B21 and B22 passing through the first and second Hall effect devices 48 and 49 are expressed as follows:

$$B22 = \beta \times \Phi2 \qquad (22).$$

The first and second Hall effect devices 48 and 49 have the same characteristics. The output voltages E21 and E22 of the Hall effect devices 48 and 49 are proportional to the magnetic flux densities B21 and B22.

$$\begin{aligned}E21 &= G \times B21 \qquad (23)\\ &= G \times \beta \times \Phi2 \times (0.5 + \theta2/90°).\end{aligned}$$

$$\begin{aligned}E22 &= G \times B22 \qquad (24)\\ &= G \times \beta \times \Phi2 \times (0.5 - \theta2/90°).\end{aligned}$$

In the equations (23) and (24), G denotes the device sensitivity determining the output voltages E21 and E22 with respect to the magnetic flux densities B21 and B22.

It is noted that when the device sensitivity G of each of the first and second Hall effect devices 48 and 49 is varied due to the ambient temperature change around the devices, the output voltages E21 and E22 are changed due to the change in the sensitivity G. In addition, the total magnetic flux Φ2 is dependent on the magnetomotive force F2 of the magnet 41, the output voltages E21 and E22 are accordingly varied due to the influence of the magnetomotive force F2 of the magnet 41.

Hence, to eliminate these influences, both of the output voltages E21 and E22 of the first and second Hall effect devices 48 and 49 are supplied to the calculation circuit 50 which performs the following calculation.

That is to say, $$S \times 2 = (E21 - E22)/(E21 + E22) \quad (25)$$
$$= 2/90° \times \theta 2.$$

Sx2 is the output signal of the divider 53.

The detection signal So2 of the amplifier output is derived as follows:

$$So2 = k \times S \times 2 + Vo \quad (26)$$
$$= 2 \times k \times \theta 2/90° + Vo.$$

In the equation (26), Vo denotes the constant voltage value (for example, 2.5 volts) and k denotes the constant amplification factor.

Consequently, when the pivoted angle θ2 indicates −45°, the detection signal of So2 indicates the minimum value (Vo−k) and when the pivoted angle θ2 indicates +45°, the maximum value (Vo+k) is outputted as the detection signal of So2.

Therefore, the detection signal So2 does not receive the influence of the magnetomotive force F2 of the magnet 41 and the device sensitivity G of each of the first and second Hall effect devices 48 and 49.

In the case where the spatial interval of distance a2 between each of the respective magnetic pole pieces 42, 43, and 44 is sufficiently small and θm2, θy2→90°, the leakage magnetic flux is developed in the same way as the case of the first embodiment.

Hence, when the pivoted angle θ2 is −45°, the output voltage E21 of the first Hall effect device 48 is reduced and the output voltage E22 of the second Hall effect device 49 is reduced when the pivoted angle θ2 is +45°.

In addition, a large error would occur in a ratio between the output voltages E21 and E22 of the Hall effect devices 48 and 49 due to an influence of the permeance PS2 of each of the first and second Hall effect devices 48 and 49 when the pivoted angle θ2 indicates around ±22.5°(45°/2).

Hence, if each of the spatial intervals of distances a2 between the first and second magnetic pole pieces 42 and 43, between the second and third magnetic pole pieces 43 and 44, and between the third and first magnetic pole pieces 44 and 42 were sufficiently small, each of the output voltages E21 and E22 from the first and second Hall effect devices 48 and 49 would not be linear and the calculation signal Sx2 would not be linear with respect to the pivoted angle θ2.

Hence, in the second embodiment, since θm2<θy2+θa2 (θy2+θa2→90°), the leakage magnetic flux passing through the second and third magnetic pole pieces 43 and 44, and θy2<θm2, the leakage magnetic flux passing through the second and third magnetic pole pieces 43 and 44 or through the first and third magnetic pole pieces 42 and 44, opposing the parallel line end portions 41C and 41D, when the pivoted angle θ2 is −45° or +45°, is reduced.

Since, in the second embodiment, G2<a2, each of the permeances P21, P22, or P23 can be considerably larger than the permeance PS2 on each of the first and second Hall effect devices 48 and 49. Hence, the influence of the permeance PS2 on the output voltages E21 and E22 of the first and second Hall effect devices 48 and 49 can be reduced. The leakage magnetic flux described above can be suppressed. In addition, the detection signal Sx2 can have the approximately proportional relationship to the pivoted angle θ2.

The advantages in the case of the second embodiment are generally the same as those described in the case of the first embodiment.

(Third Embodiment)

Figure 16:
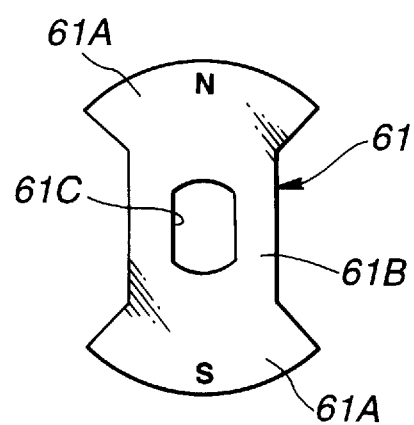
FIG. 16 is a top view of the permanent magnet used in the pivoted angle sensor in a third preferred embodiment according to the present invention.

FIG. 16 shows a third embodiment of the sensor arranged for detecting the pivoted angle and its direction.

It is noted that the other structure and operation of the sensor than the magnet 61 are the same as that described in the first or second preferred embodiment.

That is to say, the magnet 61 has an approximately letter H shape in a cross section of FIG. 16. The magnet 61 includes a pair of magnetized pole portions 61A and 61A, each being formed in an arc shape (sector shape) around a corresponding one of a pair of peripheral ends, and a pair of bar-shaped linkage portions 61B and 61B linking both of the pair of the magnetic pole portions 61A and 61A.

Although the magnet 61 has the similar shape as that 4 in the first embodiment, each magnetized pole portion 61A is of the arc shape with the axle 3 as the center over the arc angle of θm1 and is formed of the N pole at one portion and the S pole at the opposite portion as shown in FIG. 16.

The penetrating hole 61C is penetrated through the center of the magnet 61 around of which the axial end of the valve axle 3 is penetrated and is fixed.

In the third embodiment, the magnet 61 is formed by the pair of the magnetic pole portions 61A and 61A and the bar-shaped linkage portion 61B, the magnetic flux developed on the magnet 61 can be widened over the arc angle of θm1 from the pair of the magnetized pole portions 61A and 61A.

Therefore, even when the pivoted angle θ1 approximately approaches ±θm1, the magnetic flux which corresponds to the opposing area at which either one of the pair of the magnetized pole portions 61A and 61A is fixed against either one and/or each of the first and second magnetic pole pieces 5, 5, 6, and 6 can accurately be introduced from the magnet 61 to the first and second Hall effect devices 11 and 12. The accurate detection of the pivoted angle θ1 can be achieved over the whole range of the pivotal movement of the valve axle 3.

It is noted that although, in the first or second embodiment, the calculation circuit 19 (50) is installed within the casing 1, the output voltages E11 and E12 (E21 and E22) of the first and second Hall effect devices 11 and 12 (48 and 49) may be outputted via the corresponding two terminal pins 14 to an externally installed calculation circuit to output the detection signal So1 (So2) to the further external, for example, control unit.

Although the magnet 4 (41, 61) serving as the pivotal movement shaft (axle) to be pivoted in either of the positive or negative direction is fixed on the axle 3, the magnet 4 (41, 61) may be fixed on the casing while the first and second magnetic pole pieces 5, 5, 6, and 6 described in the first embodiment or the first, second, and third magnetic pole pieces 42, 43, and 44 may be pivoted by means of the valve axle as the pivotal movement shaft.

Although, in each embodiment described above, the first magnetic pole piece(s) 42 (5, 5) and the second magnetic pole piece(s) 43 (6, 6) or the third magnetic pole piece 44 are extended circumferencially over respectively determined angular ranges, each of the first and second or third magnetic pole pieces may be split into respectively narrowed angular ranges to form, respectively, two or more magnetic pole pieces.

(Fourth Embodiment)

Figure 17:
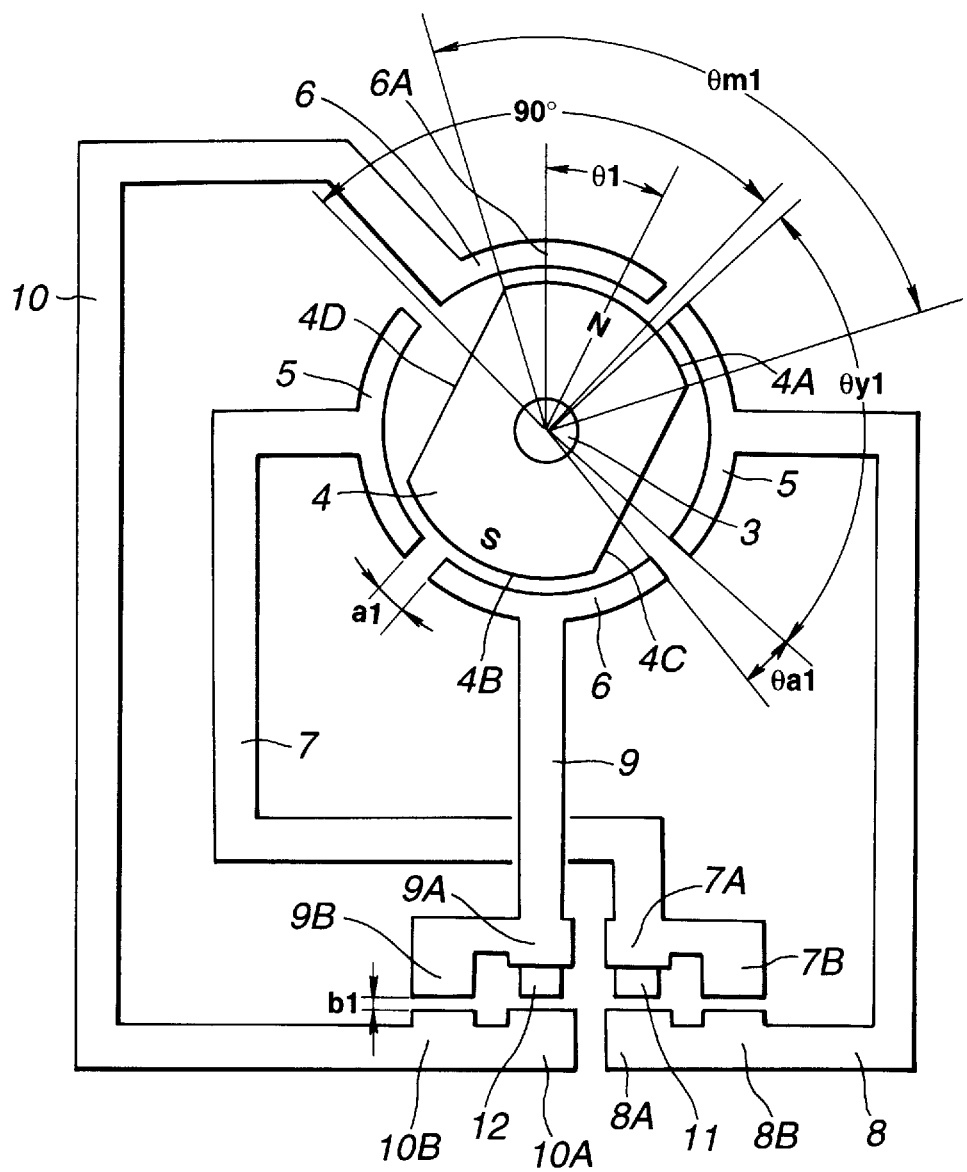
FIG. 17 is an explanatory view of the pivoted angle sensor for explaining bypass portions formed on two pairs of magnetic path forming portions used in the pivoted angle sensor of a fourth preferred embodiment according to the present invention.

FIG. 17 shows a fourth preferred embodiment of the sensor arranged for detecting the pivoted angle and the pivoted direction according to the present invention.

In the fourth embodiment, the tip ends of the first magnetic path forming portions 7 and 8 are provided with the device inserting (interposing) portions 7A and 8A extended along the rear surface of the printed circuit board 13 and, further, with first bypass portions 7B and 8B branched from the device inserting portions 7A and 8A, respectively. The first bypass portions 7B and 8B are opposed against each other, as shown in FIG. 17, with a small clearance therebetween so as to provide a relatively small magnetic resistance thereat than the magnetic resistance between the device inserting portions 7A and 8A to bypass the front and rear ends of the first Hall effect device 11. Since the small magnetic resistance is provided at the pair of the first bypass portions 7B and 8B, the magnetic resistance between the device inserting portions 7A and 8A between which the first Hall effect device 11 is inserted becomes accordingly reduced due to a parallel magnetic connection relationship.

In addition, the tip ends of the second magnetic path forming portions 9 and 10 are provided with the device inserting (interposing) portions 9A and 10A extended along the rear surface of the printed circuit board 13 and, further, with second bypass portions 9B and 10B branched from the device inserting portions 9A and 10A, respectively. The second bypass portions 9B and 10B are opposed against each other with the same small clearance as the case of the first branched portions 7B and 8B so as to provide the relatively smaller magnetic resistance thereat than that between the device inserting (interposing) portions 9A and 10A to bypass the front and rear ends of the second Hall effect device 12. The area at which the device inserting portions 7A and 8A are opposed via the first Hall effect device 11 is equal to that at which the device inserting portions 9A and 10A are opposed via the second Hall effect device 12. The spatial interval of the clearance shown in FIG. 17 between the first bypass portions 7B and 8B is equal to that denoted by b1 in FIG. 17 between the second bypass portions 9B and 10B. Since the small magnetic resistance is provided between the tip ends of the second branched portions 9B and 10B, the magnetic resistance between the tip ends of the device inserting portions 9A and 10A between which the second Hall effect device 12 is inserted becomes accordingly small due to the same reason described above.

The other structure and operation of detection are the same as those described in the first embodiment.

Since the small magnetic resistance first and second bypass portions 7B and 8B and 9B and 10B are provided on the tip end portions of the first and second magnetic path forming portions 7 and 8 and 9 and 10, respectively, in the fourth embodiment, the permeance PS1 on each of the first and second Hall effect devices 11 and 12 is increased so that the influence of the permeance PS1 concerning each of the first and second Hall effect devices 11 and 12 on the magnetic fluxes Φ11 and Φ12 passing through the first and second magnetic circuits, respectively, can remarkably be reduced.

Consequently, more linear detection signal So1 can be outputted and a more accurate detection of the pivoted angle θ1 can be made.

(Fifth Embodiment)

Figure 18:
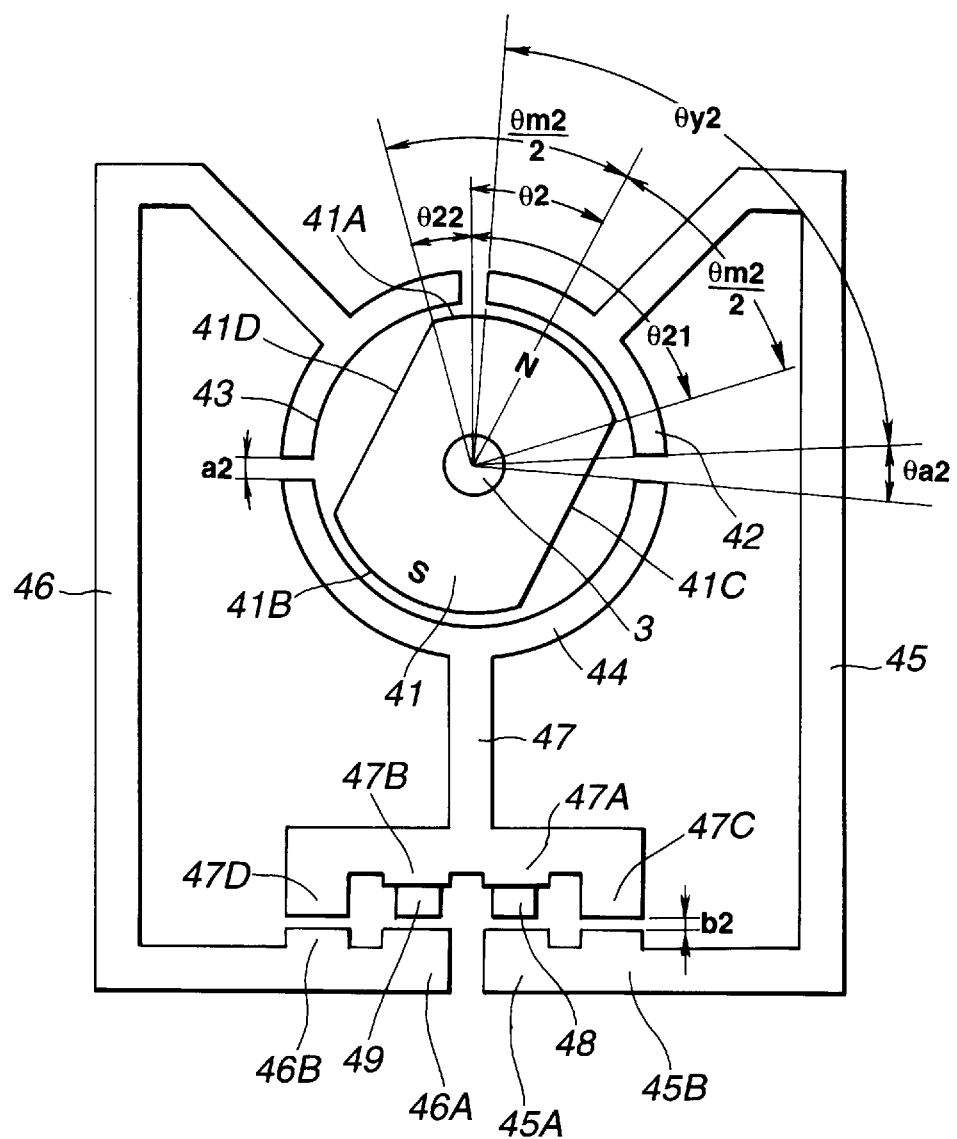
FIG. 18 is an explanatory view of the pivoted angle sensor for explaining bypass portions formed on magnetic path forming portions used in a fifth preferred embodiment of the pivoted angle sensor according to the present invention.

FIG. 18 shows a fifth preferred embodiment of the pivoted angle sensor according to the present invention.

In the fifth embodiment, as appreciated from FIG. 18, the tip end (free end) of the first magnetic path forming portion 45 is provided with one 45B of a pair of first bypass portions 45B and 47C, located before the device inserting portion 45A, and the tip end branched in a rightward direction from the third magnetic path forming portion 47 is provided with the other 47C of the pair of the first bypass portions 45B and 47C, located behind the device inserting portion 47A.

In addition, the tip end of the second magnetic path forming portion 46 is provided with one 46B of a pair of second bypass portions 46B and 47D, located before the device inserting portion 46A, and the tip end branched in a leftward direction from the third magnetic path forming portion 47 is provided with the other 47D of the pair of the second bypass portions 46D and 47D, located behind the device inserting portion 47B.

The one of the pair of the first bypass portions 47C and 45B is formed against the other of the pair of the first bypass portions with a small clearance b2. The one of the pair of the second bypass portions 46B and 47D is faced against the other of the pair of the second bypass portions with the equal small clearance b2. Each of the pair of the first and second bypass portions 45B and 47C and 46B and 47D has the relatively small magnetic resistance than that in the device inserting portions through which the corresponding one of the first and second Hall effect devices 48 and 49 is inserted as in the case of each of the bypass portions in the fourth embodiment.

The other structure and detection principle are the same as those described in the second embodiment.

Consequently, the permeance PS2 on each of the Hall effect devices 48 and 49 is relatively increased so that the influence of the permeance PS2 concerning each of the first and second Hall effect devices 48 and 49 on the output voltage signals E21 and E22 of the respective first and second Hall effect devices 48 and 49 (the magnetic fluxes Φ21 and Φ22 passing through the first and second magnetic circuits) can remarkably be reduced.

In addition, the magnetic flux which corresponds to the magnetic resistance between the respective device inserting portions 45A and 47A and the pair of the first bypass portions 45B and 47C is passed through the first Hall effect device 48.

The magnetic flux which corresponds to the magnetic resistance between the respective device inserting portions 46A and 47B and the pair of the second bypass portions 46B and 47D is passed through the second Hall effect device 49.

Hence, the output voltages E21 and E22 which are proportional to the magnetic fluxes Φ21 and Φ22 can be outputted from the respective first and second Hall effect devices 48 and 49 so that the more accurate detection of the pivoted angle θ2 can be made.

It is noted that the structure of the throttle valve is exemplified by a U.S. Pat. No. 5,462,026 issued on Oct. 31, 1995 (the disclosure of which is herein incorporated by reference).

It is also noted that the external control unit connected to the terminal pins 14 is exemplified by a U.S. Pat. No. 5,350,043 issued on Sep. 27, 1994 (the disclosure of which is herein incorporated by reference).

What is claimed is:

1. A sensor comprising:

a) a pivotable valve axle arranged so as to be pivoted through a pivoted angle (θ1, θ2);

b) a magnet arranged so as to move in concert with the pivotable valve axle;

c) a first magnetic circuit, magnetically connected to the magnet and spatially separated therefrom, through which a first magnetic flux ($\phi11$, $\phi12$) branched from a total magnetic flux ($\phi1$, $\phi2$) developed from the magnet is passed and returned to the magnet;

d) a second magnetic circuit, magnetically connected to the magnet and spatially separated therefrom, through which a second magnetic flux ($\phi12$, $\phi22$) branched from the total magnetic flux ($\phi1$, $\phi2$) developed from the magnet is passed and returned to the magnet;

e) a pair of magnetically separated first and second Hall effect devices, the first Hall effect device being interposed in the first magnetic circuit so as to output a first signal according to the first magnetic flux passing therethrough and the second Hall effect device being interposed in the second magnetic circuit so as to output a second signal according to the second magnetic flux passing therethrough; and f) a calculation circuit, in response to the first and second signals of the first and second Hall effect devices, for calculating a level of a detection signal (So1, So2) of the sensor from the first and second signals outputted from the first and second Hall effect devices and for outputting the detection signal, the level of the detection signal being linearly varied according to the pivoted angle of the pivotable valve axle.

2. A sensor as claimed in claim 1, wherein the magnet is attached on the pivotable valve axle so as to be pivoted together with the pivotable valve axle, wherein the first magnetic circuit includes: a first permeance part (P11) constituted by one (4A) of a pair of N pole and S pole magnetized arcuated peripheral end portions (4A and 4B) formed on the magnet and one of second magnetic pole pieces (6, 6) which is faced against the one of the pair of the arcuated peripheral end portions of the magnet through a first angle ($\theta$11) with a constant gap (G1); a permeance part (PS1) constituted by the second Hall effect device (12); and a second permeance part (P14) constituted by the other (4B) of the pair of the arcuated peripheral end portions (4A, 4B) formed on the magnet and the other of the second magnetic pole pieces (6, 6) which is formed against the other (4B) of the pair of the peripheral end portions through the first angle ($\theta$11) with the constant gap (G1) and wherein said second magnetic circuit includes: a third permeance part (P12) constituted by the one (4A) of the pair of the arcuated peripheral end portions and one of first magnetic pole pieces (5, 5) which is faced against the one of the pair of the arcuated peripheral end portions through a second angle ($\theta$12) with the constant gap (G1); the permeance part (PS1) constituted by the first Hall effect device (11); and a fourth permeance part (P13) constituted by the other (4B) of the pair of the arcuated peripheral end portions and the other of the first magnetic pole pieces which is faced against the other of the pair of the arcuated peripheral end portions of the magnet through the second angle ($\theta$12) with the constant gap (G1).

3. A sensor as claimed in claim 2, wherein P11=$\alpha$1×$\mu$0×$\theta$11=$\alpha$1×$\mu$0×$\theta$1, P12=$\alpha$1×$\mu$0×$\theta$12=$\alpha$1×$\mu$0×$\theta$12=$\alpha$1×$\mu$0(90°-$\theta$1), P13=$\alpha$1×$\mu$0×$\theta$11=P11, and P14=$\alpha$1×$\mu$0×$\theta$12=P12, wherein $\alpha$1 denotes a constant value determined according to an axial size of the magnet along the valve axle, an axial size of each of the first and second magnetic pole pieces, and a length of the gap between the magnet and each of the first and second magnetic pole pieces and $\mu$0 denotes a permeability.

4. A sensor as claimed in claim 3, wherein the total magnetic flux ($\Phi$1) is expressed as:

$$\Phi1 = F1/\{(1/P11)+(1/P13)\} + F1/\{(1/P12)+(1/P14)\}$$
$$= F1 \times (P11+P12)/2$$
$$= F1 \times \alpha1 \times \mu0 \times 90°/2,$$

wherein F1 denotes a magnetomotive force that the magnet develops, wherein the first magnetic flux ($\Phi$11) passing through the first magnetic circuit is expressed as;

$$\Phi11 = \Phi1 \times P11/(P11+P12)$$
$$= \Phi1 \times \alpha1 \times \mu0 \times \theta1/(\alpha1 \times \mu0 \times 90°),$$

and wherein the second magnetic flux ($\Phi$12) passing through the second magnetic circuit is expressed as;

$$\Phi12 = \Phi1 \times P12/(P11+P12)$$
$$= \Phi1 \times \alpha1 \times \mu0 \times (90°-\theta1)/(\alpha1 \times \mu0 \times 90°)$$
$$= \Phi1 \times (1-\theta1/90°).$$

5. A sensor as claimed in claim 4, wherein magnetic flux densities (B11 and B12) passing through the first and second Hall effect devices are as follows:

$$B11=\beta1\times\Phi11,$$

and $$B12=\beta1\times\Phi12$$

and wherein the first signal outputted from the first Hall effect device is E11=G×B11=G×$\beta$1×$\Phi$1×$\theta$1/90° and the second signal outputted from the second Hall effect device is E12=G×B12=G×$\beta$1×$\Phi$1×(1-|$\theta$1|/90°), wherein G denotes a device sensitivity that each of the first and second Hall effect device has and $\beta$1 denotes a constant value determined according to an area at which each of first magnetic path forming portions connected to the first magnetic pole pieces is faced against a corresponding one of second magnetic path forming portions connected to the second magnetic pole pieces via the corresponding one of the first and second Hall effect devices.

6. A sensor as claimed in claim 5, wherein the detection signal (So1) of the calculation circuit is outputted as follows: So1=k×Sx1+Vo1=k×$\theta$1/90°+Vo1, wherein k denotes a constant amplification factor, Vo1 denotes a constant voltage, and Sx1 is expressed as $$Sx1=E11/(|E11|+E12)=\theta1/90°.$$

7. A sensor as claimed in claim 6, wherein the pivoted angle of the pivotable valve axle ($\theta$1) is zero degrees when a center of the one (4A) of the pair of arcuated peripheral end portions of the magnet is faced against a center (6A) of the one of the magnetic pole pieces (6, 6) with the constant gap (G1), the first Hall effect device outputting the first signal (E11) of a minimum value of zero volts, and wherein the pivoted angle ($\theta$1) is 90° when the center of the one (4A) of the pair of the arcuated peripheral end portions is faced against a center of the first magnetic pole pieces (5, 5), the first Hall effect device outputting the first signal of a maximum value.

8. A sensor as claimed in claim 7, wherein the magnet has a pair of parallel straight line end portions (4C, 4D) other than the pair of the arcuated peripheral end portions, each of the pair of the arcuated peripheral end portions (4A and 4B) has a first arc angle ($\theta$m1) between both ends of each of the pair of the arcuated peripheral end portions with an axial center of the valve axle penetrated through a hole provided at a center of the magnet as a center, each of the first and second magnetic pole pieces has a second arc angle ($\theta$y1) between both ends of each of the first and second magnetic pole pieces, and a spatial interval of distance (a1) ($\theta$a1) is provided between one of the first magnetic pole pieces and adjacent one of the second magnetic pole pieces, and wherein $\theta$m1<$\theta$y1+2$\theta$a1, $\theta$y1+$\theta$a1→90°, and $\theta$m1<$\theta$y1+$\theta$a1.

9. A sensor as claimed in claim 8, wherein θy1<θm1 and G1<a1.

10. A sensor as claimed in claim 9, wherein a pair of first bypass portions (7B, 8B) are provided between tip ends of the one (8) of the first magnetic path forming portions and of the other (7) of the first magnetic path forming portions and a pair of second bypass portions (9B, 10B) are provided between the tip ends of the one (10) of the second magnetic path forming portions and of the other (9) of the second magnetic path forming portions, a magnetic resistance of each of the first and second bypass portions being such that a linearity in each of the first and second signals (E11 and E12) to be outputted from the first and second Hall effect devices is not affected by the permeance part (PS1) constituted by each of the first and second Hall effect device.

11. A sensor as claimed in claim 1, wherein the magnet is attached on the pivotable valve axle so as to be pivoted together with the pivotable valve axle, wherein the first magnetic circuit includes: a first permeance part (P21) constituted by one (41A) of a pair of N pole and S pole magnetized arcuated peripheral end portions (41A and 41B) formed on the magnet and a part of a first magnetic pole piece (42) which is faced against the one (41A) of the pair of the arcuated peripheral end portions (41A and 41B) through a first angle (θ21) with a constant gap (G2); a permeance part (PS2) constituted by the first Hall effect device (48); and a second permeance part (P23) constituted by the other (41B) of the pair of the arcuated peripheral end portions (41A and 41B) and a third magnetic pole piece (44) which is faced against the other (41B) of the arcuated peripheral end portions wholly with the constant gap, and wherein the second magnetic circuit includes: a third permeance part (P22) constituted by the one (41A) of the pair of the arcuated peripheral end portions of the magnet and a part of a second magnetic pole piece (43) which is faced against the one of the pair of the peripheral end portions through a second angle (θ22) with the constant gap G2; the permeance part (PS2) constituted by the second Hall effect device; and the second permeance part (P23) which is common to that in the first magnetic circuit.

12. A sensor as claimed in claim 11, wherein P21=α2×μ0×θ21=α2×μ0×(45°+θ2), P22=α2×μ0×θ22=α2×μ0×(45°−θ2), and P23=α2×μ0×90°=P21+P22, wherein α2 denotes a constant value determined according to an axial angle of the magnet along the pivotable valve axle, an axial size of each of the first, second, and third magnetic pole pieces, and a shortest length of the gap G2 between the magnet and each of the first, second, and third magnetic pole pieces and μ0 denotes a permeability.

13. A sensor as claimed in claim 12, wherein the total magnetic flux (Φ2) is expressed as:

$$\Phi2 = F2 \times 1/\{(1/P21 + P22) + 1/P23\}$$
$$= F2 \times P23/2$$
$$= F2 \times \alpha2 \times \mu0 \times 90°/2,$$

wherein F2 denotes a magnetomotive force that the magnet developes, wherein the first magnetic flux (Φ21) is expressed as:

$$\Phi21 = \Phi2 \times P21/(P21 + P22)$$
$$= \Phi2 \times \alpha2 \times \mu0 \times (45° + \theta2)/\alpha2 \times \mu0 \times 90°$$
$$= \Phi2 \times (0.5 + \theta2/90°),$$

and wherein the second magnetic flux (Φ22) is expressed as follows:

$$\Phi22 = \Phi2 \times P22/(P21 + P22)$$
$$= \Phi2 \times \alpha2 \times \mu0 \times (45° - \theta2)/(\alpha2 \times \mu0 \times 90°)$$
$$= \Phi2 \times (0.5 - \theta2/90°).$$

14. A sensor as claimed in claim 13, wherein magnetic densities (B21 and B22) passing through the first and second Hall effect devices are as follows:

$$B21 = \beta \times \Phi2,$$

and $$B22 = \beta \times \Phi2,$$

wherein the first signal outputted from the first Hall effect device is E21=G×β×Φ2×(0.5+θ2/90°) and the second signal outputted from the second Hall effect device is E22=G×B22=G×β×Φ2×(0.5−θ2/90°), wherein G denotes a device sensitivity that each of the first and second Hall effect device has and β denotes a constant value determined according to an area at which a third magnetic path forming portion connected to the third magnetic pole piece is faced against each of first and second magnetic path forming portions, each connected to a corresponding one of the first and second magnetic pole pieces, via each of the first and second Hall effect devices.

15. A sensor as claimed in claim 14, wherein the detection signal (So2) of the calculation circuit is outputted as follows: So2=k×Sx2+Vo=2×k×θ2/90°+Vo, wherein k denotes a constant amplification factor, Vo denotes a constant voltage, and Sx2 is expressed as Sx2=(E21−E22)/(E21+E22)=2/90°×θ2.

16. A sensor as claimed in claim 15, wherein the pivoted angle of the pivotable valve axle (θ2) is zero degrees when a center of the one (41A) of the pair of the arcuated peripheral end portions is faced against a center of a spatial interval of distance (a2) between the first and second magnetic pole pieces, the detection signal (So2) outputted from the calculation circuit indicating zero volts, wherein the pivoted angle of the pivotable valve axle (θ2) is −45° when the center of the one (41A) of the pair of the arcuated peripheral end portions is faced against a center of the second magnetic pole piece, the detection signal (So2) indicating a minimum value of Vo−k, and wherein the pivoted angle of the pivotable valve axle (θ2) is +45° when the center of the one 41A of the pair of the arcuated peripheral end portions is faced against a center of the spatial interval of distance (a2) (θa2) between the first and third magnetic pole pieces, the detection signal (So2) outputted from the calculation circuit indicating a maximum value of Vo+k.

17. A sensor as claimed in claim 16, wherein the magnet has a pair of parallel straight line end portions (41C and 41D) other than the pair of the arcuated peripheral end portions, each of the pair of the arcuated peripheral end portions has a first arc angle (θm2) intervened between both ends of each of the pair of the arcuated peripheral end portions with an axial center of the valve axle penetrated through a hole provided at a center of the magnet as a center, each of the first and second magnetic pole pieces has a second arc angle (θy2) intervened between both ends of each of the first and second magnetic pole pieces, and the spatial interval of the distance (a2) (θa2) is provided between each of the first, second, and third magnetic pole pieces, and wherein θm2<θy2+2 θa2, and θm2<θy2+θa2.

18. A sensor as claimed in claim 17, wherein G2<a2 and wherein a third arc angle intervened between both ends of the third magnetic pole piece with the axial center of the valve axle as the center is 360°−2θy2−3θa2.

19. A sensor as claimed in claim 18, wherein a pair of bypass portions are provided on the third magnetic path forming portion (47), each tip end (47C and 47D) of the pair of the bypass portions being faced via a constant clearance (b2) against a corresponding one of a pair of extended end portions (45B and 46B) located before a corresponding one of tip ends (45A and 46A) of the first and second magnetic path forming portions (45 and 46) which is faced against a corresponding one of tip ends (47A and 47B) of the third magnetic path forming portion (47) via the corresponding one of the first and second Hall effect device, so as to suppress an influence of the permeance part (PS2) constituted by each of the first and second Hall effect devices on a linearity of each of the first and second
signals to be outputted from the first and second Hall effect devices.

20. A sensor as claimed in claim 19, wherein the magnet is of an approximately letter-H cross section having the pair of the arcuated peripheral end portions and the pair of the parallel straight line end portions.

21. A pivoted angle sensor arranged for detecting a pivoted angle through which a pivotable axle is pivoted thereon, comprising:
   a) an envelope defining an enclosed space therein, said space having an approximately circular cross section;
   b) a permanent magnet attached onto the pivotable axle elongated normal to a plane formed by the circular cross section of the enclosed space at a center of the circular cross section and having a pair of arcuated outer peripheral end portions which are symmetrical to each other with an axial center of the pivotable axle as a center, wherein a first arc angle for each of the pair of arcuated outer peripheral end portions is defined as being intervened between a virtual line passing through one end of the corresponding one of the arcuated outer peripheral end portions and the center and another virtual line passing through the other end of the corresponding one of the arcuated outer peripheral end portions and the center being a first predetermined angle ($\theta m1$, $\theta m2$);
   c) a plurality of mutually spaced apart arc-shaped magnetic pole pieces, each magnetic pole piece being disposed within the envelope, being extended along a peripheral direction of the envelope so as to magnetically face against the permanent magnet with a constant gap (G1, G2) against the arcuated outer peripheral end portions of the permanent magnet and having a spatial interval of distance (a1, a2) between an elongated end of the corresponding one of the plurality of the magnetic pole pieces and that of the adjacent one of the others of the magnetic pole pieces, and at least one of the arc-shaped magnetic pole pieces having a second arc angle between a virtual line passing through one elongated end of the corresponding one of the plurality of the magnetic pole pieces and the center of the pivotable axle and another virtual line passing through the other elongated end thereof and the center, said second arc angle being a second predetermined angle ($\theta y1$, $\theta y2$); and
   d) a magnetic-to-electrical transducing circuit which is coupled to the plurality of magnetic pole pieces and which is so constructed and arranged so as to provide a pair of first and second signals developed according to a variation in opposing areas defined between the permanent magnet, spatial intervals of distances between the plurality of magnetic pole pieces, and the plurality of magnetic pole pieces when the permanent magnet is pivoted with the pivotable axle through an angle ($\theta1$, $\theta2$), the pair of first and second signals being linearly varied according to the angle ($\theta1$, $\theta2$), and wherein the spatial interval of distance (a1, a2) between each of the plurality of magnetic pole pieces is longer than the constant gap (G1, G2).

22. A pivoted angle sensor arranged for detecting a pivoted angle through which a pivotable axle is pivoted thereon as claimed in claim 21, wherein said envelope comprises a cylindrical casing and said magnetic pole pieces comprise two pair of first and second arc-shaped magnetic pole pieces, each pair of the first and second arc-shaped magnetic pole pieces being symmetrically arranged within said cylindrical casing with the axial center of the pivotable axle as the center, an angle intervened between a virtual line passing through the one elongated end of one of the pair of the first magnetic pole pieces and the center and another virtual line passing through the one elongated end of one of the pair of the second magnetic pole pieces which is adjacent to the one elongated end of one of the pair of the first magnetic pole pieces being a third predetermined angle ($\theta a1$), and wherein a total angle ($\theta y1+2\theta a1$) summing the third predetermined angle ($\theta a1$), the second predetermined angle ($\theta y1$), and the third predetermined angle ($\theta a1$) is longer than the first predetermined angle ($\theta m1<\theta y1+2\theta a1$).

23. A pivoted angle sensor arranged for detecting a pivoted angle through which a pivotable axle is pivoted thereon as claimed in claim 22, wherein said magnetic-to-electrical transducing circuit comprises: two first magnetic path forming portions, one of the two first magnetic path forming portions being formed between one of the pair of the first arc-shaped magnet pole pieces and an aerial gap against one end of a first Hall effect device and the other of the first magnetic path forming portions being formed between the other of the pair of the first arc-shaped magnetic pole pieces and the other end of the first Hall effect device; and two second magnetic path forming portions, one of the second magnetic path forming portions being formed between one of the pair of the second arc-shaped magnet pole pieces and an aerial gap against one end of a second Hall effect device, the aerial gap against the one end of the second Hall effect device having an equal length to that against the one end of said first Hall effect device, and the other of the second magnetic path forming portions being formed between the other of the pair of the second magnetic pole pieces and the other end of said second Hall effect device.

24. A pivoted angle sensor arranged for detecting a pivoted angle through which a pivotable axle is pivoted thereon as claimed in claim 23, wherein said angle through which the permanent magnet is pivoted with the pivotable axle is the angle ($\theta1$) between a virtual line passing through an approximately center portion of the other of the pair of the second magnetic pole pieces and another virtual line passing through a center pole portion of the arc-shaped peripheral end portions of the permanent magnet.

25. A pivoted angle sensor arranged for detecting a pivoted angle through which a pivotable axle is pivoted thereon as claimed in claim 24, wherein said magnetic-to-electrical transducing circuit comprises a calculation circuit having: an absolute value circuit which is so constructed and arranged as to provide an absolute value $|E11|$ of an output voltage signal of said first Hall effect device; an adder which is so constructed and arranged as to add the absolute value $|E11|$ of the output voltage signal of said first Hall effect device to an output voltage signal $E_{12}$ of said second Hall effect device; a divider which is so constructed and arranged as to divide the output voltage of said first Hall effect device by an output signal of said adder to provide a detected voltage Sx1 for an amplifier.

26. A pivoted angle sensor arranged for detecting a pivoted angle through which a pivotable axle is pivoted thereon as claimed in claim 25, wherein said amplifier outputs a pivoted angle detected voltage signal So1 corresponding to the angle θ1 through which the permanent magnet is pivoted with the pivotable axle as follows:

$$So1 = k \times Sx1 + Vo1,$$

wherein k denotes an amplification factor of the amplifier, Sx1 is expressed as θ1/90°(=E11/{|E11|+E12}), Vo1 denotes a constant voltage value.

27. A pivoted angle sensor arranged for detecting a pivoted angle through which a pivotable axle is pivoted thereon as claimed in claim 26, wherein the output voltage (E11) of said first Hall effect device is expressed as follows:

$$\begin{aligned} E11 &= G \times B11 \\ &= G \times \beta 1 \times \Phi 1 \times \theta 1/90°, \end{aligned}$$

wherein G denotes a sensitivity that each of the first and second Hall effect devices has, β1 denotes a constant concerning a mutually opposing area between the one end of the one of the first magnetic path forming portions and the one end of the other of said first magnetic path forming portions, Φ1 denotes a total magnetic flux generated by a magnetomotive force F of the permanent magnet and passing through first and second magnetic circuits, said first magnetic circuit being formed by the permanent magnet, the pair of the first magnetic pole pieces, and the pair of the first magnetic path forming portions, the second magnetic circuit being formed by the permanent magnet, the pair of the second magnetic pole pieces, and the pair of the second magnetic path forming portions, both of the first and second magnetic circuits being in magnetically parallel relationship to each other, and Φ1 being always constant.

28. A pivoted angle sensor arranged for detecting a pivoted angle through which a pivotable axle is pivoted thereon as claimed in claim 27, wherein the output voltage signal (E12) of said second Hall effect device is E12=G×β1×Φ1×(1−|θ1|/90°).

29. A pivoted angle sensor arranged for detecting a pivoted angle through which a pivotable axle is pivoted thereon as claimed in claim 8, wherein said calculation circuit is disposed on a printed circuit board together with said first and second Hall effect devices, said printed circuit board being installed on said cylindrical casing so as to be magnetically shielded from said permanent magnet and the magnetic pole pieces.

30. A pivoted angle sensor arranged for detecting a pivoted angle through which a pivotable axle is pivoted thereon as claimed in claim 21, wherein said envelope comprises a cylindrical casing and said arc-shaped magnetic pole pieces comprise first, second, and third magnetic pole pieces, the second arc angle of said first and second magnetic pole pieces being the first predetermined angle (θm2) and the second arc angle of said third arc-shaped magnetic pole piece being 360°−(3× the spatial angular distance of a2)−2×θm2 and wherein the first predetermined angle (θm2) is less than 90°.

31. A pivoted angle sensor arranged for detecting a pivoted angle through which a pivotable axle is pivoted thereon as claimed in claim 30, wherein said magnetic-to-electrical transducing circuit comprises: a first magnetic path forming portion formed between the first arc-shaped magnetic pole piece and an aerial gap against one end of a first Hall effect device; a second magnetic path forming portion formed between the second arc-shaped magnetic pole piece and an aerial gap against one end of a first Hall effect device; a second magnetic path forming portion formed-between the second arc-shaped magnetic pole piece and an aerial gap against one end of a second Hall effect device; and a third magnetic path forming portion formed between the third magnetic pole piece and both other ends of said first and second Hall effect devices.

32. A pivoted angle sensor arranged for detecting a pivoted angle through which a pivotable axle is pivoted thereon as claimed in claim 31, wherein said first Hall effect device outputs the first voltage signal (E21) as follows:

$$\begin{aligned} E21 &= G \times B21 \\ &= G \times \beta \times \Phi 2 \times (0.5 + \theta 2/90°), \end{aligned}$$

wherein B21=β×2, G denotes a sensitivity that said first Hall effect device has, β denotes a constant concerning an opposing area between the one end of said third magnetic path forming portion and the one end of said first magnetic path forming portion with the aerial gap provided against the one end of said first Hall effect device, Φ2 denotes a total magnetic flux generated by a magnetomotive force F2 of said permanent magnet and passing through first and second magnetic circuits, said first magnetic circuit being formed by the permanent magnet, the first magnetic pole piece, the first magnetic path forming portion, the third magnetic path forming portion, and the third magnetic pole piece and said second magnetic circuit being formed by the permanent magnet, the second magnetic pole piece, the third magnetic path forming portion, and the third magnetic pole piece, the total magnetic path Φ2 being constant, and θ2 denotes the angle through which the permanent magnet is pivoted with the pivotable axle.

33. A pivoted angle sensor arranged for detecting a pivoted angle through which a pivotable axle is pivoted thereon as claimed in claim 32, wherein said second Hall effect device outputs the second voltage signal (E22) as follows:

$$\begin{aligned} E22 &= G \times B22 (\because B22 = \beta \times \Phi 2) \\ &= G \times \beta \times \Phi 2 \times (0.5 - \theta 2/90°). \end{aligned}$$

34. A pivoted angle sensor arranged for detecting a pivoted angle through which a pivotable axle is pivoted thereon as claimed in claim 33, wherein said magnetic-to-electrical transducing circuit comprises a calculation circuit having: a subtractor which is so constructed and arranged as to subtract the second output voltage signal (E22) from the first output voltage signal (E21); and adder which is so constructed and arranged as to add the first output voltage signal of said first Hall effect device to the second output voltage signal of said second Hall effect device (E11+E22); and a divider which is so constructed and arranged as to divide an output voltage signal from said subtractor by an output voltage signal from said adder {(E21−E22)/(E21+E22)}=2/90°×θ2; and an amplifier which is so constructed and arranged as to amplify an output voltage signal from said divider and output a voltage signal S02 (S02=k×Sx2+Vo=2×k×θ2/90°+Vo, wherein k denotes a constant amplification factor of the amplifier, Vo denotes a constant voltage.

35. A pivoted angle sensor arranged for detecting a pivoted angle through which a pivotable axle is pivoted thereon as claimed in claim 31, wherein said third magnetic path forming portion further comprises first and second bypass forming portions, a tip end of said first bypass forming portion being faced against an intermediate projected end of said first magnetic path forming portion with an aerial gap which is parallel to the aerial gap between the one end of said first Hall effect device and the one end of the first magnetic path forming portion and a tip end of said second bypass forming portion being faced against an intermediate projected end of said second magnetic path forming portion with an aerial gap which is parallel to the aerial gap between the one end of said second Hall effect device and the one end of the second magnetic path forming portion.

36. A pivoted angle sensor arranged for detecting a pivoted angle through which a pivotable axle is pivoted thereon as claimed in claim 35, wherein the pivotable axle corresponds to a valve axle of an throttle valve and the pivoted angle corresponds to an opening angle of the throttle valve, the throttle valve being disposed in an intake air passage of an internal combustion engine.

37. A sensor comprising:
 a) a pivotable valve axle arranged so as to be pivoted through a pivoted angle ($\theta 1$, $\theta 2$);
 b) a magnet which is attached on the pivotable valve axle so as to be pivoted together with the valve axle;
 c) a first magnetic circuit, magnetically connected to the magnet and spatially separated therefrom, through which a first magnetic flux ($\phi 11$, $\phi 12$) branched from a total magnetic flux ($\phi 1$, $\phi 2$) developed from the magnet is passed and returned to the magnet;
 d) a second magnetic circuit, magnetically connected to the magnet and spatially separated therefrom, through which a second magnetic flux ($\phi 12$, $\phi 22$) branched from the total magnetic flux ($\phi 1$, $\phi 2$) developed from the magnet is passed and returned to the magnet;
 e) a pair of magnetically separated first and second Hall effect devices, the first Hall effect device being interposed in the first magnetic circuit so as to output a first signal according to the first magnetic flux passing therethrough, and the second Hall effect device being interposed in the second magnetic circuit so as to output a second signal according to the second magnetic flux passing therethrough; and
 f) a calculation circuit, in response to the first and second signals of the first and second Hall effect devices, for calculating a level of a detection signal (So1, So2) of the sensor from the first and second signals outputted from the first and second Hall effect devices and for outputting the detection signal, the level of the detection signal being linearly varied according to the pivoted angle of the pivotable valve axle.

* * * * *